United States Patent [19]

Morita

[11] Patent Number: 4,887,259
[45] Date of Patent: Dec. 12, 1989

[54] COMMUNICATION NETWORK HAVING MULTI-CONJUNCTION ARCHITECTURE

[75] Inventor: Tetsuya Morita, Yokohama, Japan

[73] Assignee: Ricoh Company, Ltd., Tokyo, Japan

[21] Appl. No.: 241,414

[22] Filed: Sep. 7, 1988

[30] Foreign Application Priority Data

Sep. 8, 1987 [JP] Japan .................................. 62-222980

[51] Int. Cl.$^4$ ............................................ H04Q 11/04
[52] U.S. Cl. ..................................................... 370/60
[58] Field of Search ............................. 370/58, 60, 94; 340/825.5

[56] References Cited

U.S. PATENT DOCUMENTS

| 4,470,154 | 9/1984 | Yano | 455/607 |
| 4,516,272 | 5/1985 | Yano | 455/607 |
| 4,719,617 | 1/1988 | Yanosy, Jr. et al. | 370/58 |
| 4,763,316 | 8/1988 | Schaich et al. | 370/58 |

OTHER PUBLICATIONS

"A Local Network Design using Fiber Optics", Randall Neff and Don Senzig, IEEE Comput Soc Int Cof 22nd, COMPCON Spring 1981.
INTERNET TRANSPORT PROTOCOLS, Xerox System Integration Standard, XSIS 028112 Dec. 1981, XEROX.

Primary Examiner—Joseph A. Orsino
Assistant Examiner—Frank M. Schutch, III
Attorney, Agent, or Firm—Oblon, Spivak, McClelland, Maier & Neustadt

[57] ABSTRACT

A communication network structure including a plurality of communication networks, and a plurality of router hosts for coupling the communication networks. The router hosts which are directly connected to an arbitrary communication network store as a whole the host numbers of all of the terminal hosts which are directly connected to certain ones of the communication networks. The certain communication networks are indirectly coupled to the arbitrary communication network through the router hosts. The router hosts which are directly connected to the arbitrary communication network do not store the host number of a terminal host which is directly connected to the arbitrary communication network.

16 Claims, 17 Drawing Sheets

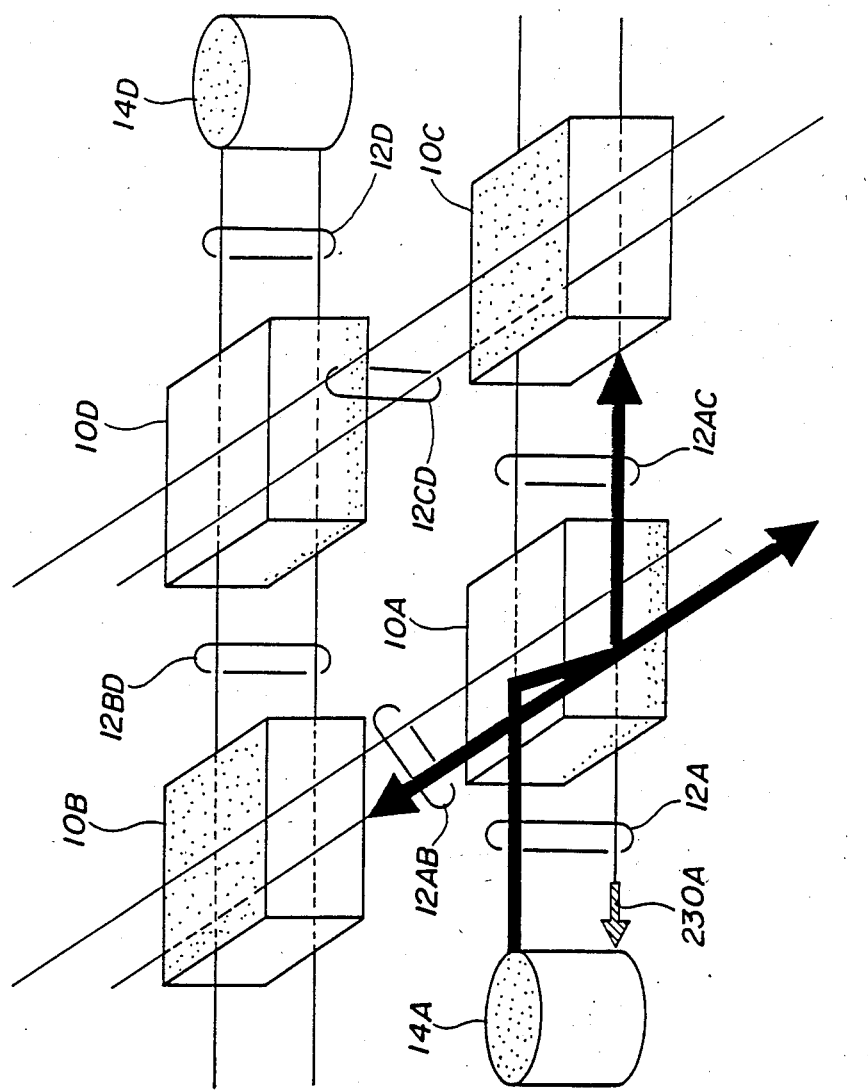

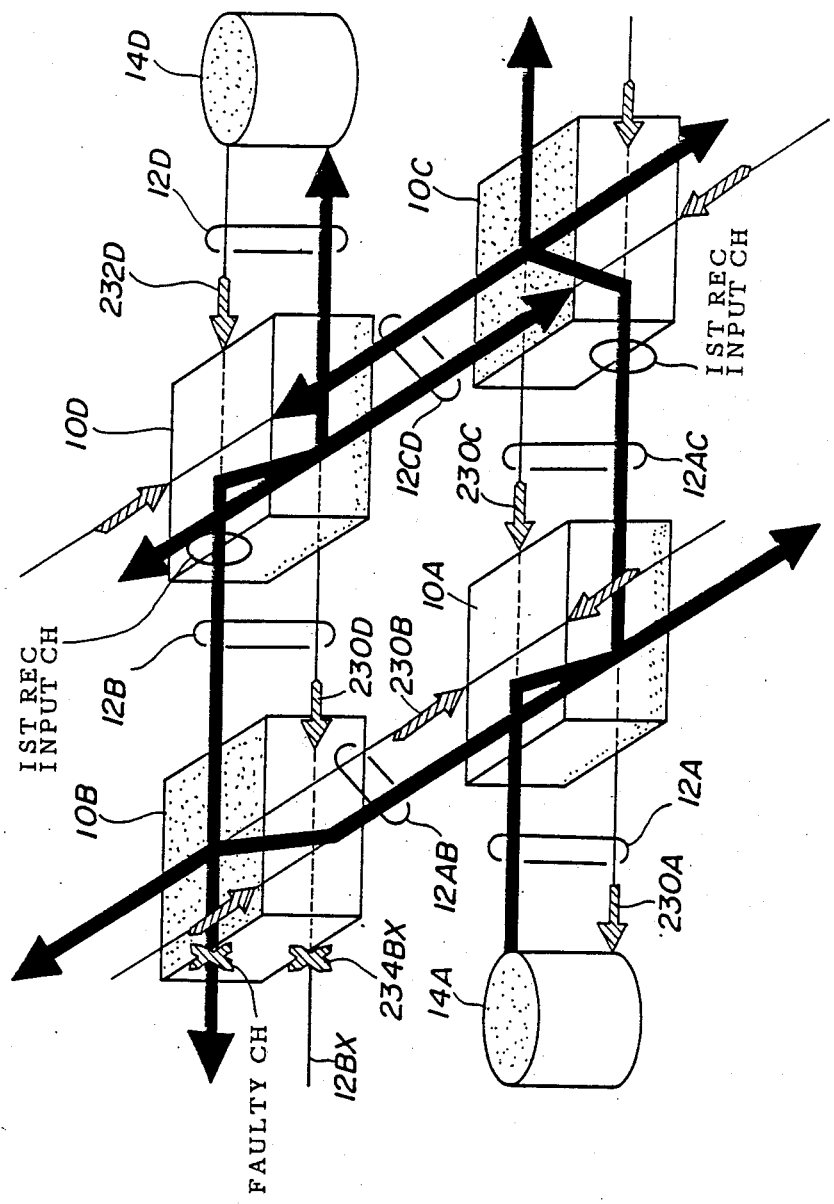

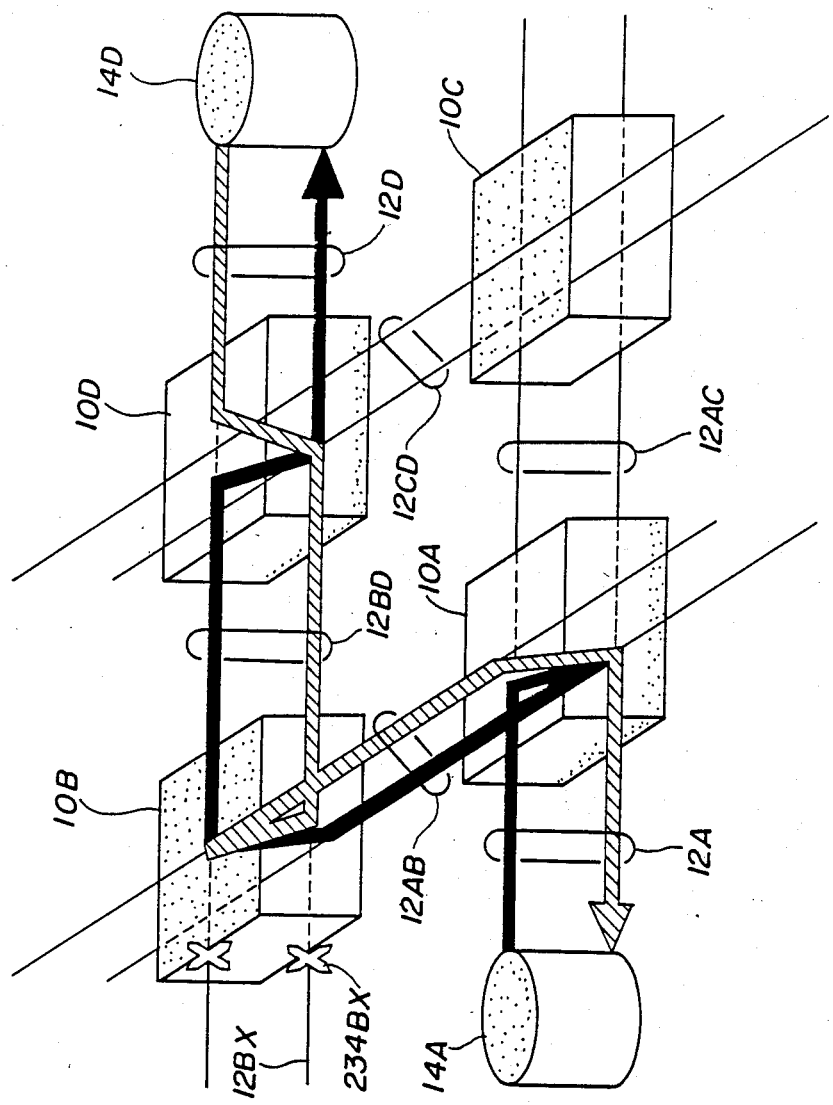

COMMUNICATION NETWORK HAVING MULTI-CONJUNCTION ARCHITECTURE

BACKGROUND OF THE INVENTION

The present invention generally relates to communication networks, and more particularly to a communication network having multi-conjunction architecture.

A lattice communication network analogous to nerve cells of a living body was proposed in a U.S. Pat. No. 4,516,272 in which the assignee is the same as the assignee of the present application. According to this proposed communication network, each node apparatus has a plurality of input and output channels and is used as a communication control element, and such node apparatuses are coupled in a multi-conjunction to constitute the lattice communication network. Each node apparatus transfers one of incoming signals according to a first-come-first-served logic (hereinafter referred to as a first-come-first-output logic).

In addition, a multi-channel lattice communication network applicable to local area networks (LANs), public line networks and especially to a multi-media communication was previously proposed in a U.S. Pat. No. 4,839,887 in which the assignee is the same as the assignee of the present application. In an initial state of this previously proposed lattice communication network where no communication is made between the input and output channels of the node apparatus, signals can pass through the node apparatus because an input port and an output port thereof are coupled through a switching gate of the node apparatus. In this initial state, each input channel is coupled to all of the output channels except the output channel having a channel number corresponding thereto.

When an input signal is supplied to one of the input channels in the initial state, the first receiving input channel which receives the input signal first is detected according to the first-come-first-output logic. Hence, only the first receiving input channel is coupled to those output channels other than the output channel having a channel number corresponding to that of the first receiving input channel. In other words, a broadcast communication is made by transferring the input signal which is received by the first receiving input channel to all of the output channels except the output channel having the channel number corresponding to that of the first receiving input channel. All of the input channels other than the first receiving input channel are disconnected from the output channels. As a result, it is possible to prevent a dropout of message packets.

Each node apparatus has a function of returning an active signal when the first receiving input channel is detected, and the active signal is outputted from the output channel having the channel number corresponding to that of the first receiving input channel. A node apparatus which receives the active signal can recognize that the output channel from which the sending signal was sent has been detected as the first receiving input channel in the node apparatus which returned the active signal.

In the previously proposed lattice communication network, a source terminal device which originates a communication must wait for a link time constant corresponding to the time it takes for the active signal to be returned to each node apparatus from neighboring node apparatuses after the communication is broadcast within the entire lattice communication network. The link time constant is set greater than or equal to two times a maximum propagation delay time of a span, that is, a line between the adjacent node apparatuses. Hence, the link time constant is dependent on a maximum distance of the line between the adjacent node apparatuses within the lattice communication network. For this reason, when an extremely long line is included in a portion of the lattice communication network, the link time constant of all of the node apparatuses in the lattice communication network must be set to a large value in accordance with the extremely long line even when the traffic of the extremely long line is considerably small.

A network time constant of the lattice communication network, that is, a time in which a receipt of a first returning signal from a destination terminal device is guaranteed, is set to a sum of two times the propagation delay time of a maximum tolerable network length and a time it takes for the destination terminal device to start sending the first returning signal. Hence, the network time constant must also be set to a large value depending on the existence of the extremely long line between the adjacent node apparatuses within the lattice communication network.

Therefore, when the extremely long line between the adjacent node apparatuses exists within the lattice communication network, the link time constant and the network time constant must be set to large values and a through-put of the lattice communication network as a whole becomes poor. The through-put becomes poor even when the extremely long line occupies only a small portion of the lattice communication network, and the efficiency of the lattice communication network is especially poor in such a case.

On the other hand, an Ethernet (registered trademark) is disclosed in "Internet Transport Protocols", Xerox System Integration Standard, XSIS 028112, December 1981. When connecting a plurality of communication networks, a network address is assigned to each communication network and a repeater station called an internetwork router host is used to couple the communication networks. The internetwork router relays a communication which is broadcast extending over a plurality of communication networks. The internetwork router has a routing table which stores a delay, a directly-connected communication network on which to transmit the packet, if the delay is not zero the host number of an internetwork router on the directly-connected communication network, and a timer used in the routing table maintenance algorithm.

The internetwork router does not know the host number other than that of the internetwork router on the directly-connected communication network. For this reason, it is necessary to know beforehand the network address of the communication network which includes a destination host. In order to find out the communication network which includes the destination host, an inquiry is made to each of the communication networks by use of a high level protocol (level 3) called clearinghouse. When the communication network including the destination host is found, the communication is made by directly designating the network number and the host number. Therefore, there is a problem in that the communication requires a complex procedure. In addition, when sending a short message to a large number of destination hosts, there is a problem in that the through-put becomes extremely poor.

SUMMARY OF THE INVENTION

Accordingly, it is a general object of the present invention to provide a novel and useful communication network employing multi-conjunction architecture in which the problems described heretofore are eliminated.

Another and more specific object of the present invention is to provide a communication network structure comprising a plurality of communication networks each having a plurality of node apparatuses coupled in a multi-conjunction, a plurality of first transmission paths for coupling the node apparatuses and a plurality of terminal hosts connected to at least an arbitrary one of the node apparatuses, where a maximum propagation delay time of the first transmission path is less than a predetermined value, one or a plurality of router hosts connected to each of the communication networks, and a second transmission path for coupling two of the communication networks through a pair of the router hosts respectively located on ends of the second transmission path, where a maximum propagation delay time of the second transmission path is greater than or equal to the predetermined value. The router host has first means for multiplexing signals to and separating signals from the second transmission path, second means for storing identification information including host numbers of at least the terminal hosts which are directly connected to the communication network which is coupled to the router host through the second transmission path, third means for controlling operations of the router host, input and output channels connected to one of the node apparatuses of the communication network and to the third means, and input and output ports connected to the third means and the second transmission path. The third means detects a first receiving input channel which receives a first sending signal first out of unused input channels connected to the one of the node apparatuses of the communication network and closes an output channel having a channel number corresponding to that of the first receiving input channel and all of the unused input channels except the first receiving input channel when the first receiving input channel is detected to immediately output an active signal to the output channel having the channel number corresponding to that of the first receiving input channel. The third means collates a destination host number included in the first sending signal and the host numbers stored in the second means and outputs a temporary first returning signal to the output channel having the channel number corresponding to that of the first receiving input channel after an input signal detection time constant when the destination host number exists in the host numbers stored in the second means, so as to fix a temporary path between a source host which originates the first sending signal and the router host. The third means outputs to a control output port of the output ports a caller information including a port designation information and the first sending signal when the destination host number exists in the host numbers stored in the second means, where the port designation information is an identification information of a port of the first means corresponding to the first receiving input channel. The third means detects a receipt of a connection completion information including the port designation information and a first returning signal at a control input port of the input ports and connects the designated output port to the output channel having the channel number corresponding to that of the first receiving input channel so as to output the first returning signal from the output channel having the channel number corresponding to that of the first receiving input channel and connects the first receiving input channel to one of the output ports corresponding to the first receiving input channel when the destination host number exists in the host numbers stored in the second means. The third means opens the closed channel other than the designated channels after the first receiving input channel and the output channel having the channel number corresponding to that of the first receiving input channel are connected to the corresponding input and output ports. The third means supervises a channel with a fixed path and releases the channel as an unused channel when a signal received at the channel continues a predetermined state for a communication end detection time constant. According to the communication network structure of the present invention, it is possible to make a communication by a simple procedure even when a relatively long line is included in the communication network, without deteriorating the through-put of the communication network structure.

Still another object of the present invention is to provide a communication network architecture comprising a plurality of communication networks each having a plurality of node apparatuses coupled in a multi-conjunction, a plurality of first transmission paths for coupling the node apparatuses and a plurality of terminal hosts connected to at least an arbitrary one of the node apparatuses, where a maximum propagation delay time of the first transmission path is less than a predetermined value, one or a plurality of router hosts connected to each of the communication networks, and a second transmission path for coupling two the communication networks through a pair of the router hosts respectively located on ends of the second transmission path, where a maximum propagation delay time of the second transmission path is greater than or equal to the predetermined value. The router host has first means for multiplexing signals to and separating signals from the second transmission path, second means for storing identification information including host numbers of at least the terminal hosts which are directly connected to the communication network which is coupled to the router host through the second transmission path, third means for controlling operations of the router host, input and output channels connected to one of the node apparatuses of the communication network and to the third means, and input and output ports connected to the third means and the second transmission path. The router host forms a temporary link between a source terminal host which originates a first sending signal including a destination host number as the identification information when the destination host number is included in the host numbers stored in the second means, and the formation of the temporary link is repeated until the first sending signal reaches the destination host. According to the communication network architecture of the present invention, it is unnecessary to know the address of the communication network to which the destination terminal host is directly connected.

A further object of the present invention is to provide a router host for coupling first and second communication networks through a first transmission path and another router host having an identical construction, where each of the first and second communication networks have a plurality of node apparatuses coupled in a multi-conjunction, a plurality of second transmission paths for coupling the node apparatuses and a plurality of terminal hosts connected to at least an arbitrary one of the node apparatuses, and a maximum propagation delay time of the second transmission path is less than a predetermined value and a maximum propagation delay time of the first transmission path is greater than or equal to the predetermined value. The router host comprises first means for multiplexing signals to and separating signals from the first transmission path, second means for storing identification information including host numbers of at least the terminal hosts which are directly connected to the first communication network which is coupled to the router host through the first transmission path and the other router host, third means for controlling operations of the router host, input and output channels connected to one of the node apparatuses of the second communication network and to the third means, and input and output ports connected to the third means and the first transmission path. The router host forms a temporary link between a source terminal host which is directly connected to the second communication network and originates a first sending signal including a destination host number as the identification information when the destination host number is included in the host numbers stored in the second means. According to the router host of the present invention, it is possible to connect the router host to the communication network even when the communication network is in use.

Other objects and further features of the present invention will be apparent from the following detailed description when read in conjunction with the accompanying drawings.

BRIEF DESCRIPTION OF THE DRAWINGS

FIGS. 4A through 4E are diagrams for explaining the sequence of communication made in a lattice communication network using four node apparatuses;

DETAILED DESCRIPTION

Figure 1:
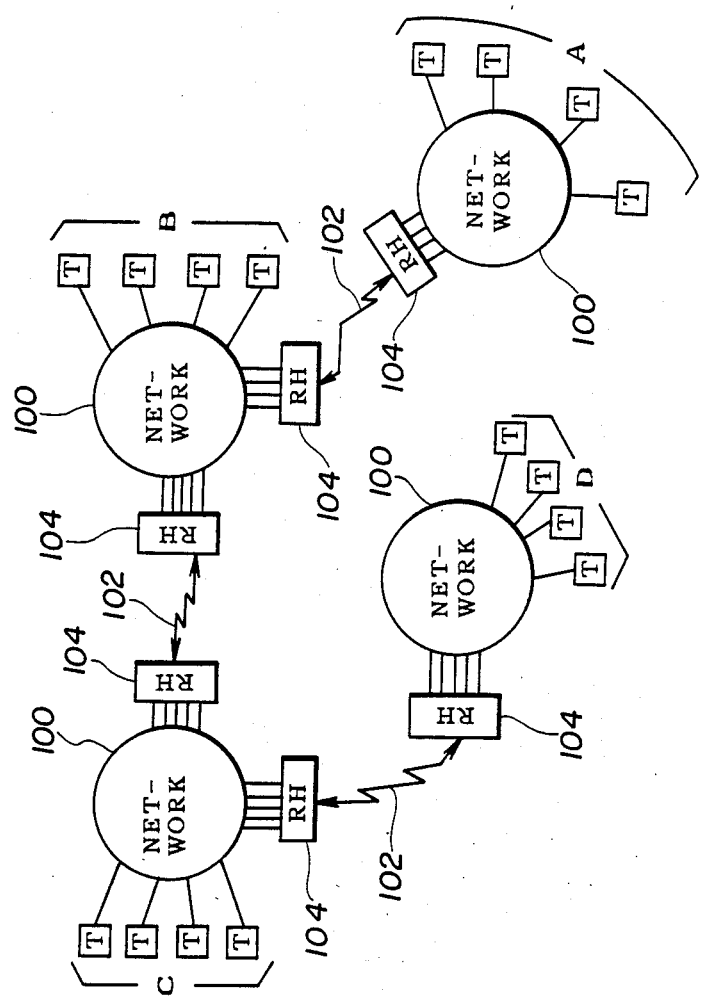
FIG. 1 is a system block diagram showing an embodiment of a communication network structure employing the multi-conjunction architecture according to the present invention.

FIG. 1 shows an embodiment of a communication network structure employing the multi-conjunction architecture according to the present invention. In FIG. 1, a plurality of communication networks 100 are coupled through long-distance lines 102, and a router host 104 is provided on both ends of each long-distance line 104. The router host 102 is a multiplexing repeater for connecting the adjacent communication networks 100.

The communication network 100 has a plurality of node apparatuses, a plurality of terminal devices T, and transmission paths. Each node apparatus is coupled to other node apparatuses and/or terminal devices T through the transmission path in two or three dimensions to constitute a lattice communication network. Each node apparatus has a plurality of input and output channels and is used as a communication control element. Each node apparatus transfers one of incoming digital signals according to the first-come-first-output logic.

Hereunder, the terminal devices T will be referred to as terminal hosts T. Each terminal host T and each router host 104 has a host number for identification thereof.

For example, the node apparatus may have functions similar to those of the node apparatus in the communication network disclosed in the U.S. Pat. No. 4,839,887 referred above.

In an initial state of this communication network where no communication is made between the input and output channels of the node apparatus, signals can pass through the node apparatus because an input port and an output port thereof are coupled through a switching gate of the node apparatus. In this initial state, each input channel is coupled to all of the output channels except the output channel having a channel number corresponding thereto. When an input signal is supplied to one of the input channels in the initial state, the first receiving input channel which receives the input signal first is detected according to the first-come-first-output logic. Hence, only the first receiving input channel is coupled to those output channels other than the output channel having a channel number corresponding to that of the first receiving input channel. In other words, a broadcast communication is made by transferring the input signal which is received by the first receiving input channel to all of the output channels except the output channel having the channel number corresponding to that of the first receiving input channel. All of the input channels other than the first receiving input channel are disconnected to the output channels.

Each node apparatus has a function of returning an active signal when the first receiving input channel is detected, and the active signal is outputted from the output channel having the channel number corresponding to that of the first receiving input channel. A node apparatus which receives the active signal can recognize that the output channel from which the sending signal was sent has been detected as the first receiving input channel in the node apparatus which returned the active signal.

Figure 2:
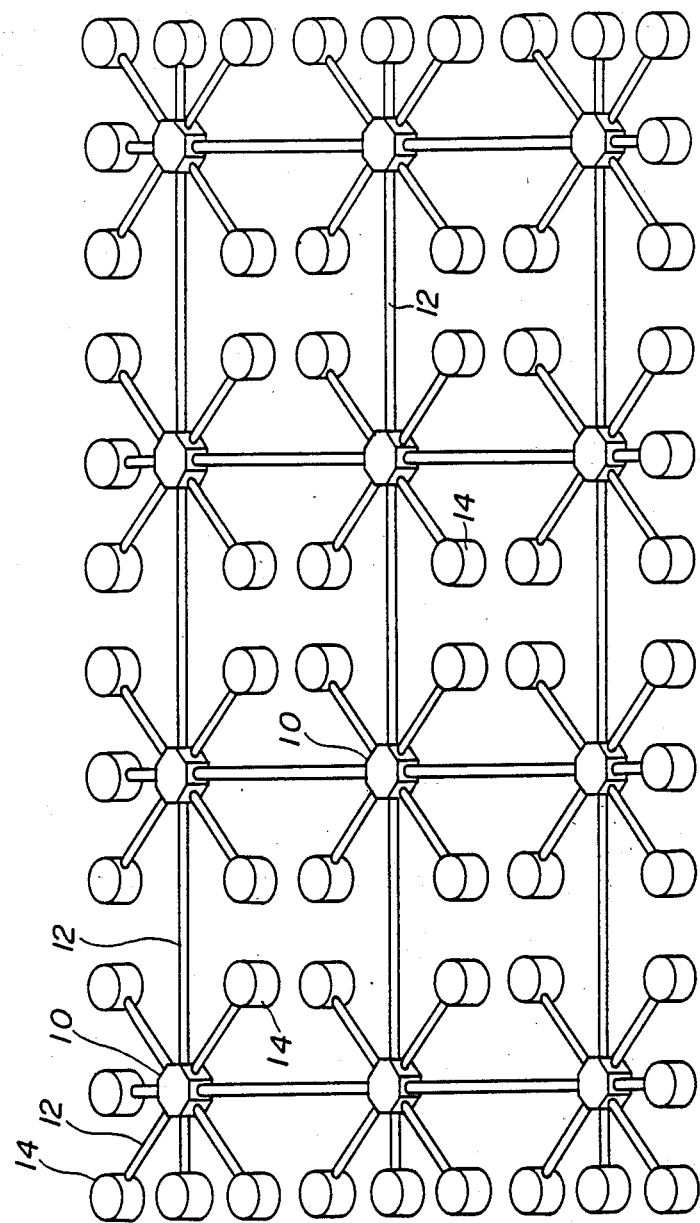
FIG. 2 shows one communication network employing the multi-conjunction architecture in the communication network structure shown in FIG. 1.

FIG. 2 shows an embodiment of the communication network 100. The communication network 100 has a plurality of node apparatuses 10, a plurality of terminal hosts 14 which are the same as the terminal hosts T shown in FIG. 1, and transmission paths 12. There is no limit to the number of input and output channels of the node apparatus 10. Hence, there is no limit to the number of node apparatuses 10 and/or terminal hosts 14 which may be coupled to the node apparatus 10 through the transmission path 12, provided that the number is within the capacity of the input and output channels of the node apparatus 10. It is possible to constitute the entire network by a single node apparatus 10. In addition, it is possible to provide a plurality of node apparatuses 10 on a single printed wiring board and treat the wiring board as a single node apparatus, so as to essentially increase the capacity of the input and output channels.

In this embodiment, the terminal host 14 can receive and transmit data asynchronously. For example, the terminal host 14 is a processing system such as a personal computer, a service station such as a filing station and a print station, and the like. It is desirable although not essential, that the data is transmitted in the form of message packets. As will be described later, it is desirable although not essential, that the terminal host 14 is designed for the full duplex communication and sends out a response signal (acknowledge packet) immediately after receipt of a sending signal (message packet) intended for the terminal host 14.

For example, the transmission path 12 is an optical transmission path constituted by optic fibers or an electrical transmission path constituted by twisted pair wire, coaxial cable and the like. In this embodiment, the data is transmitted in analog or digital form, and the full duplex communication is carried out in the network. The transmission path 12 between the node apparatus 10 and the terminal host 14 may be designed for the half duplex communication. It is possible to provide a plurality of transmission paths 12 between the node apparatuses 10 depending on the traffic.

Figure 3:
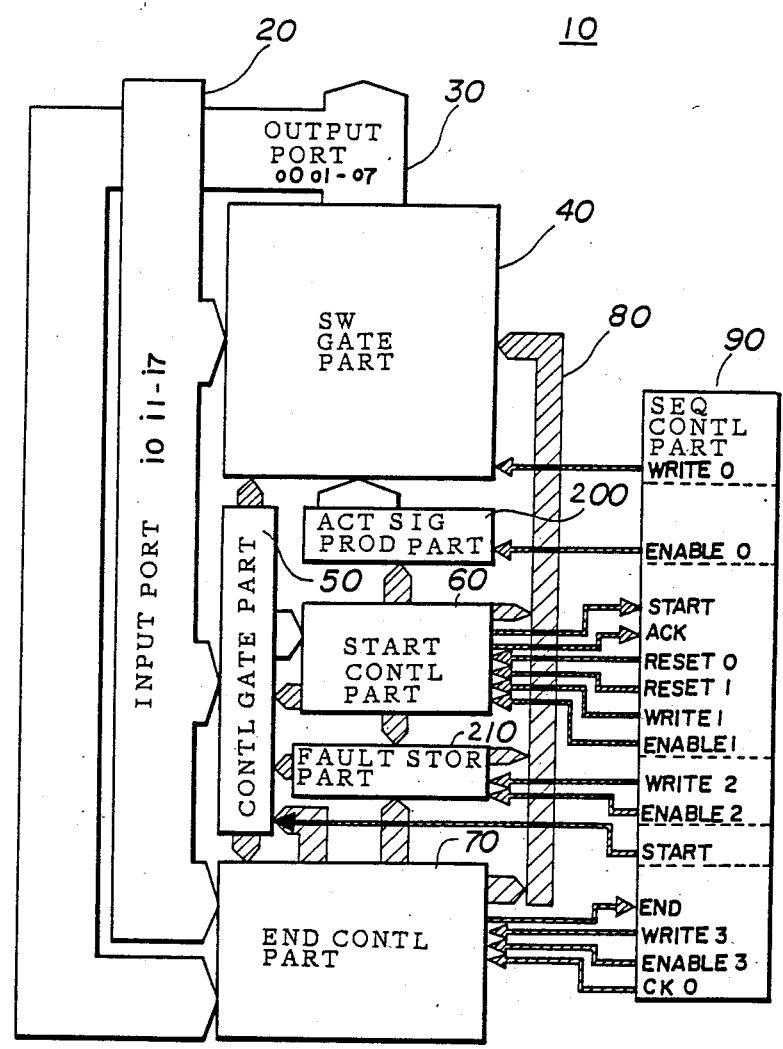
FIG. 3 is a system block diagram showing an embodiment of a node apparatus in the communication network shown in FIG. 2.

FIG. 3 shows an embodiment of the node apparatus 10. The node apparatus 10 generally has an input port, 20, an output port 30, a switching gate part 40, a control gate part 50, a start control part 60, an end control part 70, a gate setting bus 80, a sequence control part 90, an active signal producing part 200 and a fault storage part 210.

The input port 20 is connected to receiving lines of the transmission path 12, while the output port 30 is connected to sending lines of the transmission path 12. The input port 20 is coupled to the output port 30 through the switching gate part 40. In this embodiment, the input port 20 has eight receiving or input channels i0 through i7, and the output port 30 has eight sending or output channels o0 through o7. Hence, in this embodiment, it is possible to connect up to eight node apparatuses 10 and/or terminal hosts 14 to one node apparatus 10 through the transmission path 12. A pair of input channel and output channel having a corresponding channel number is coupled to another node apparatus 10 (or terminal host 14).

The switching gate part 40 selectively couples an arbitrary one of the input channels i0 through i7 to an arbitrary one of the output channels o0 through o7. The input port 20 is coupled to the start control part 60 and the end control part 70 through the control gate part 50. The control gate part 50 controls the supply of the signals from the input port 20 to the start control part 60 and the supply of the signals from the start control part 60, the fault storage part 210 and the end control part 70 to the appropriate one of the switching gate part 40, the start control part 60 and the end control part 70.

The start control port 60 detects whether or not the input signal is received by the input port 20 and discriminates the first receiving input channel which receives the input signal first. The end control part 70 detects the end of the input signal received by the input channel connected to the set communication path, and carries out a communication ending process. The switching gate part 40, the start control part 60 and the end control part 70 are coupled to each other through the gate setting bus 80.

A communication end detection time constant (fourth predetermined time) is provided to detect that no signal follows after the sending signal or the returning signal and the communication is ended. It is detected that the communication is ended when no signal is received or a predetermined logic value of the received signal continues for a time defined by the communication end detection time constant. The length of the communication end detection time constant is set to a time which is required to discriminate the true end of the communication from consecutive "0"s or "1"s in the case of the full duplex communication. Normally, a slight margin time is added to the length of the communication end detection time constant. For example, the length of the communication end detection time constant is one bit in the case of the Manchester encoding, and is seven or more bits in the case of the encoding in which "0" is inserted into six consecutive "1"s in non-return-to-zero invert (NRZI). Normally, the length of the communication end detection time constant is made two times longer to add the slight margin time, that is, to two bits or fourteen or more bits. This length of the communication end detection time constant is the same as the length of an input signal detection time constant.

When enabling both the full duplex communication and the half duplex communication, the length of the communication end detection time constant is set to a time which is essentially equal to a sum of a propagation delay time for a return trip covering the maximum tolerable distance between the node apparatus 10 and another node apparatus 10 or the terminal host 14 and a time it takes for the terminal host 14 to start sending a returning (or sending) signal after receipt of a sending (or returning) signal. Normally, a slight margin time is added to this length of the communication end detection time constant. The communication end detection time constant is the same as a terminal response supervision time.

The end of the communication may be detected from the input signal received by the first receiving input channel, so that a restore process is carried out when the input signal is no longer received by the first receiving input channel. Alternatively, it is possible to carry out the restore process when the input signal is no longer obtained at either one of the first receiving input channel or the output channel coupled thereto. It is possible to detect that an input signal is no longer obtained at a channel when the logic value of the input signal remains the same (for example, "0") for the length of the communication end detection time constant.

The active signal producing part 200 for producing an active signal is coupled to the switching gate part 40 and the start control part 60. The active signal producing part 200 produces an active signal indicating that the node apparatus 10 is operating normally and is active. The active signal has no restrictions except for the signal length thereof. The signal length of the active signal is set to a value which is longer than a minimum time required to operate flip-flops of the start control part 60 and terminates within the length of an active detection time constant. The active detection time constant (first predetermined time or link time constant) is provided to exclude input signals received by input channels other than the first receiving input channel.

Accordingly, even when the input signal from the same source as the input signal received by the first receiving input channel is received by another input channel or when another input signal from another source is received by another input channel and a collision occurs, the input signals received by the input channels other than the first receiving input channel will be excluded.

The length of the active detection time constant is set to a time which is essentially equal to a sum of a propagation delay time for a return trip covering a maximum tolerable distance between the node apparatus 10 and another node apparatus 10 or the terminal host 14 and the duration of the active signal. Normally, a slight margin time is added to the length of the active detection time constant. The input signal identical to that received by the first receiving input channel but obtained through a roundabout route is received by an input channel other than the first receiving input channel, the input signals from other sources are received by the input channels other than the first receiving input channel and the active signal is received from the active signal producing part 200, all within the length of the active detection time constant. Hence, it is possible to detect the faulty or dormant channel.

The fault storage part 310 for storing the data on the faulty or dormant input channel is coupled to the start control part 60, the end control part 70 and the gate setting bus 80.

The switching gate part 40, the control gate part 50, the start control part 60, the end control part 70, the active signal producing part 200 and the fault storage part 210 are respectively controlled by the sequence control part 90. The active detection time constant and the input signal detection time constant are timed in the sequence control part 90.

The input signal detection time constant (second predetermined time) is provided to detect whether or not there is an input signal after a first supervision time defined by the active detection time constant. For example, the length of the input signal detection time constant is one bit in the case of the Manchester encoding, and is seven or more bits in the case of the encoding in which "0" is inserted into six consecutive "1"s in NRZI. Normally, a slight margin time is added to the one or seven bits to make it two times longer, and the length of the input signal detection time constant is set to two bits or fourteen or more bits. The input signal detection time constant is provided to distinguish the active signal from the sending signal originating from the same source and another sending signal from another source which are received by the input channels other than the first receiving input signal.

Next, a description will be given on the sequence of the communication made in a lattice communication network using four node apparatuses 10 described heretofore, by referring to FIGS. 4A through 4E. For convenience sake, four node apparatuses 10A through 10D are coupled in the lattice form through transmission paths 12A, 12AB, 12AC, 12BD, 12CD and 12D each having four channels in FIGS. 4A through 4E. A terminal host 14A is coupled to the node apparatus 10A, and a terminal host 14D is coupled to the node apparatus 10D. In FIGS. 4A through 4E, a dot-pattern is provided on the transmitting side of each node apparatus or terminal host, a bold arrow indicates the flow of the sending signal, and an arrow with hatchings indicates the flow of the response signal and the returning signal.

When carrying out the full duplex communication, the detection of the input signal and the control of the coupling between the input and output channels based on this detection are carried out in the following five basic steps.

Firstly, the lattice network is in the initial state, and in a first step shown in FIG. 4A, the terminal host 14A, for example, transmits a sending signal in the form of the message packet. The sending signal includes a destination address indicative of the intended destination of the sending signal, and the intended destination is the terminal 14D in this case. The sending signal is supplied to the node apparatus 10A through the transmission path 12A. In the initial state, each input channel of the node apparatus 10A is coupled to all of the output channels thereof except the output channel having a channel number corresponding thereto.

When the node apparatus 10A detects that the sending signal from the terminal host 14A is received first, the node apparatus 10A transfers the sending signal to all of the output channels thereof except the output channel having the channel number corresponding to that of the first receiving input channel connected to the transmission path 12A. In other words, the sending signal is broadcast from the node apparatus 10A from the output channels connected to the transmission paths 12AB, 12AC and the like. In addition, the node apparatus 10A disconnects from the output channels thereof the input channels which are other than the first receiving input channel and are not in the fixed transmission path, and an active signal 230A is produced from the active signal producing part 200 and is supplied to the output channel of the node apparatus 10A having the channel number corresponding to that of the first receiving input channel which is connected to the transmission path 12A.

Next, in a second step shown in FIG. 4B, the node apparatus 10B receives the sending signal through the transmission path 12AB, the node apparatus 10C receives the sending signal through the transmission path 12AC, and the node apparatus 10D receives the sending signal through the transmission paths 12BD and 12CD. The node apparatuses 10B, 10C and 10D broadcast the sending signal similarly as in the case of the node apparatus 10A. In this case, the node apparatus 10C detects the input channel thereof connected to the transmission path 12AC as being the first receiving input channel. Hence, the sending signal received through the transmission path 12AC is broadcast through the transmission paths other than the transmission path 12AC, that is, through the transmission path 12CD and the like. In addition, the node apparatus 10C supplies an active signal 230C to an output channel thereof having a channel number corresponding to that of the first receiving input channel which is connected to the transmission path 12AC.

The node apparatus 10D receives the sending signal from the transmission paths 12BD and 12CD, but detects the input channel thereof connected to the transmission path 12BD as being the first receiving input channel. Hence, the node apparatus 10D broadcasts only the sending signal received through the transmission path 12BD to other transmission paths such as the transmission paths 12D and 12CD. The sending signal received through the transmission path 12CD is not broadcast from the node apparatus 10D. In addition, the node apparatus 10D supplies an active signal 230D to an output channel thereof having a channel number corresponding to that of the first receiving input channel which is connected to the transmission path 12BD.

In the node apparatuses 10C and 10D, when the difference between the arrival time of the sending signal received by the first receiving input channel and the arrival time of the sending signal received thereafter by another input channel is shorter than the time it takes for the control of the coupling of the input and output channels to be completed, a signal overlap occurs for an instant. However, this signal overlap occurs within the beginning portion of the preamble of the message packet and is negligible, and for this reason, no problems will be caused thereby. Thus, the sending signal transmitted from the terminal host 14A and broadcasted from the node apparatus 10A is transmitted within the network without any signal overlap that would cause problems. Further, this negligible signal overlap is not accumulated at each node apparatus, since the signal overlap always occurs within the same beginning portion of the preamble of the message packet.

Each of the node apparatuses 10A through 10D supervise all of the input channels thereof within the first supervision time which starts from the detection of the first receiving input channel, so as to detect the input channel which receives no signal during the first supervision time. The data on the input channel which receives no signal during the first supervision time is stored in the input signal detecting part 60. In the normal state where no fault exists in the node apparatus and the node apparatuses and the terminal hosts coupled thereof, the active signal should arrive to the input channels during this first supervision time. When the active signal does not arrive to an input channel this input channel is discriminated as being a faulty or dormant channel, and the data on the faulty or dormant channel is stored in the fault storage part 210. For example, in FIG. 4B, an input channel 234BX of the node apparatus 10B connected to a transmission path 12BX is a faulty or dormant input channel.

Each of the node apparatuses 10A through 10D supervise all of the input channels thereof within a second supervision time which starts after the lapse of the first supervision time. At this time, the active signal is already ended. The input channel which receives no input signal during the second supervision time may be coupled to all of the output channels other than the output channel being a channel number corresponding to that of this input channel. The input channel which receives no input signal during the second supervision time and is not identified as being a faulty or dormant input channel in the fault storage part 210 may be coupled to all of the output channels other than the output channel having a channel number corresponding to that of this input channel.

Figure 4C:
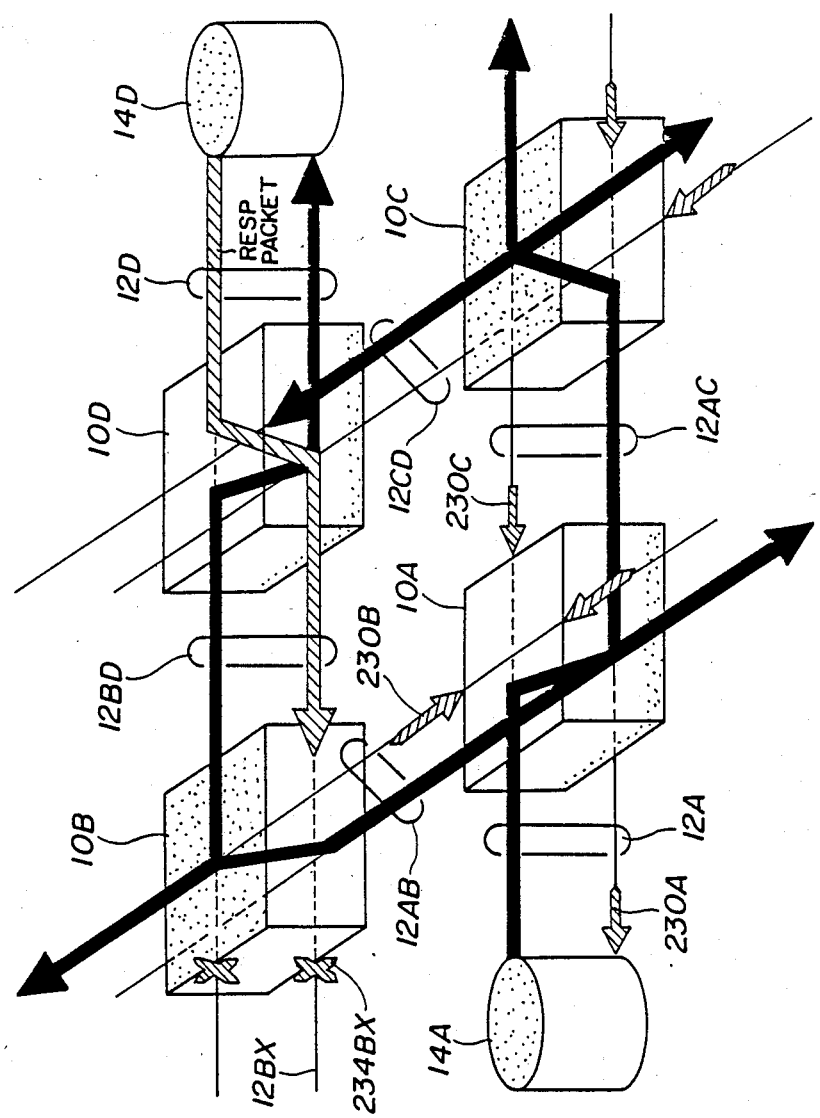

In a third step, the terminal hosts coupled to the node apparatuses 10A through 10D receive the sending signal originating from the source terminal host 14A, and each terminal host returns the active signal upon receipt of the sending signal and also collates its own address with the destination address included in the sending signal. In this case, the terminal host 14D returns an active signal 232D as shown in FIG. 4B, and since the destination address included in the sending signal coincides with the address of the terminal host 14D, the terminal host 14D transmits a returning signal to the transmission path 12D. When the node apparatus 10D receives the returning signal from the transmission path 12D as shown in FIG. 4C, the node apparatus 10D detects out of the input channel having channel numbers corresponding to those of the output channels from which the sending signal was transmitted the input channel which receives no signal during the second supervision time but receives a signal after the end of the second supervision time. This detected input channel is coupled to the output channel having the channel number corresponding to that of the first receiving input channel.

In the case shown in FIG. 4C, when the node apparatus 10D receives the returning signal from the transmission path 12D after a predetermined time elapses from the second supervision time, the node apparatus 10D connects the input channel which receives the returning signal to the output channel which has a channel number corresponding to that of the first receiving input channel and is connected to the transmission path 12BD. Accordingly, the returning signal from the transmission path 12D is outputted from the node apparatus 10D through the transmission path 12BD.

Then, after the terminal response supervision time in the case of the full duplex communication and after the fourth predetermined time defined by the communication end detection time constant in the case where both the full duplex communication and the half duplex communication are to be enabled, the node apparatus 10D couples all of the remaining input channels to all of the output channels other than the output channel having the channel number corresponding to that of the input channel which received the returning signal. As a result, it is possible to prevent the node apparatus 10D from detecting the sending signal from the transmission path 12CD shown in FIG. 4D. In other words, in this case, the transmission paths 12BD and 12D become coupled to each other.

Figure 4D:
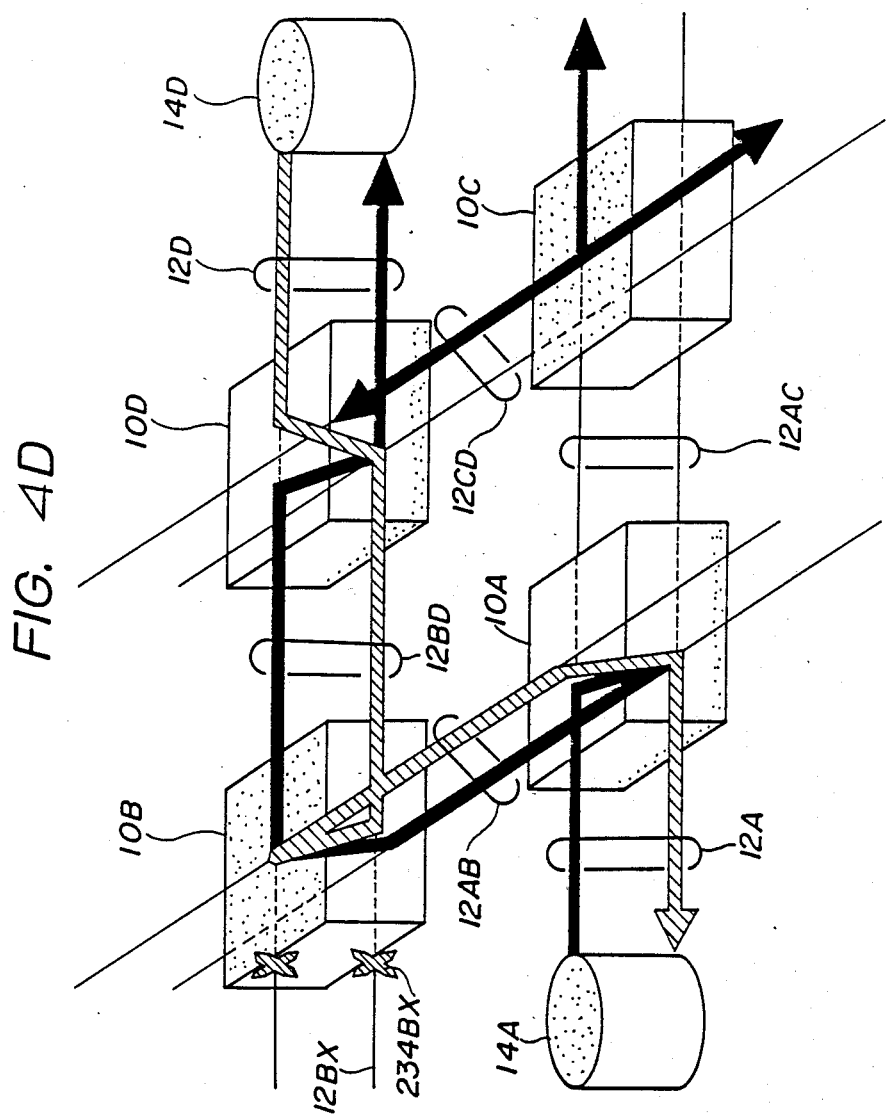

In a fourth step, the node apparatuses 10B and 10A carry out control similar to that carried out by the node apparatus 10D. Hence, as shown in FIG. 4D, the returning signal reaches the terminal host 14A through the communication path which was used to transfer the sending signal. The sending signal has a predetermined length, and the terminal hosts such as the terminal host 14D transmits the returning signal immediately after the destination address of the sending signal is discriminated. Accordingly, the sending signal and the returning signal are transmitted simultaneously. For this reason, even when terminal hosts other than the terminal hosts 14A and 14D are connected to the network, these other terminal hosts receive the overlapping sending signal and the returning signal and cannot discriminate the information content due to the interference caused by the overlap. Therefore, the secrecy of the transmission to the other terminal hosts which is very important in the communication network is maintained. In addition, it is possible to carry out the multi-channel communication.

In a fifth step shown in FIG. 4E, when the node apparatus 10C detects that the returning signal is not received through the transmission path 12CD and the like and the sending signal is no longer received through the transmission path 12AC, the node apparatus 10C couples each of the input channels to all of the output channels other than the output channel having a channel number corresponding thereto. In other words, when the node apparatus 10C detects that no input signal is received during the second supervision time, that the returning signal is not received even after the second supervision time and that the sending signal is no longer received, the node apparatus 10C couples each of the input channels to all of the output channels other than the output channel having a channel number corresponding thereto. This means that the communication path is fixed by way of paths excluding the node apparatus 10C or that the communication is not completed and the terminal host 14A has discontinued to send the sending signal. Accordingly, in all other cases, the arrival of the returning signal within the terminal response supervision time starting from the detection of the first receiving input channel is guaranteed. When the sending signal does not reach the terminal host 14D for some reason and the terminal host 14A discontinues the transmission of the sending signal because the returning signal is not received, the node apparatus 10C couples each of the input channels to all of the output channels other than the output channel having a channel number corresponding thereto.

In the case where both the full duplex communication and the half duplex communication are to be enabled, when the node apparatus 10C detects that the sending signal is no longer received through the transmission path 12AC and the returning signal is not received through the transmission path 12CD and the like even after the time defined by the communication end detection time constant elapses, the node apparatus 10C couples each of the input channels to all of the output channels other than the output channel having a channel number corresponding thereto. In other words, when the node apparatus 10C detects that there are input channels which do not receive the sending signal and do not receive the returning signal during the terminal response supervision time which starts from the end of the sending signal, the node apparatus 10C couples each of these input channels to all of the output channels other than the output channel having the channel number corresponding thereto.

By controlling the coupling of the input and output channels in each of the node apparatuses 10 (10C in this case) not included in the communication path of the sending signal and the returning signal, it is possible to set and fix the communication path between the terminal host 14A and the terminal host 14D. Each of the node apparatuses 10 may carry out the control to set and fix a communication path through the paths which are unused by the communication path which is already fixed and in use.

Therefore, each node apparatus 10 detects the existence or non-existence of the input signal and carries out sequential control during the times defined by the active detection time constant, the input signal detection time constant, the terminal response supervision time and the communication end detection time constant. For example, in the case where the source terminal host 14 from which the first sending signal originates is authorized to continue and end the full duplex communication, that is, normally when the interval of the sending signal is shorter than the time it takes to detect the end of the signal and the returning signal is transmitted intermittently, the node apparatus 10 detects that a signal is no longer received by the pair of input channels in the fixed communication path or detects that a signal is no longer received by either one of the pair of input channels in the fixed communication path. In this case, the node apparatus 10 couples all of the input channels to all of the output channels other than the output channels having channel numbers corresponding to those of the pair of input channels in the fixed communication path. In this state, the returning signal is not transmitted.

In the case of the half duplex communication and in the case of the full duplex communication where no priority needs to be set for the transmitting station and the receiving station, the node apparatus 10 detects that a signal is no longer received by neither channels of the pair of input channels in the fixed communication path, and couples all of the input channels to all of the output channels other than the output channels having channel numbers corresponding to those of the pair of input channels in the fixed communication path.

Instead of detecting the end of the communication by detecting that a signal is no longer received by neither channels of the pair of input channels, it is possible to detect the end of the communication by detecting that a signal is no longer obtained at either the input channel or an output channel having a channel number corresponding to that of this input channel, with respect to the pair of input channels. This is because, when a signal is no longer obtained at one channel of the pair of input channels, a signal is of course no longer obtained at the output channel having a channel number corresponding to that of the other channel of the pair of input channels.

Instead of detecting the end of the communication by detecting that a signal is no longer received by neither channels of the pair of input channels, it is possible to detect the end of the communication by detecting that a signal is no longer obtained at one channel of the pair of input channels nor at an output channel having a channel number corresponding to that of the one channel of the pair of input channels. This is because, when a signal is no longer obtained at neither channels of the pair of input channels, a signal is of course no longer obtained at neither channels of the pair of output channels having channel numbers corresponding to those of the pair of input channels.

The node apparatus 10 and the constituent elements thereof are further disclosed in the U.S. Pat. No. 4,839,887 the disclosure of which is hereby incorporated by reference.

Figure 5:
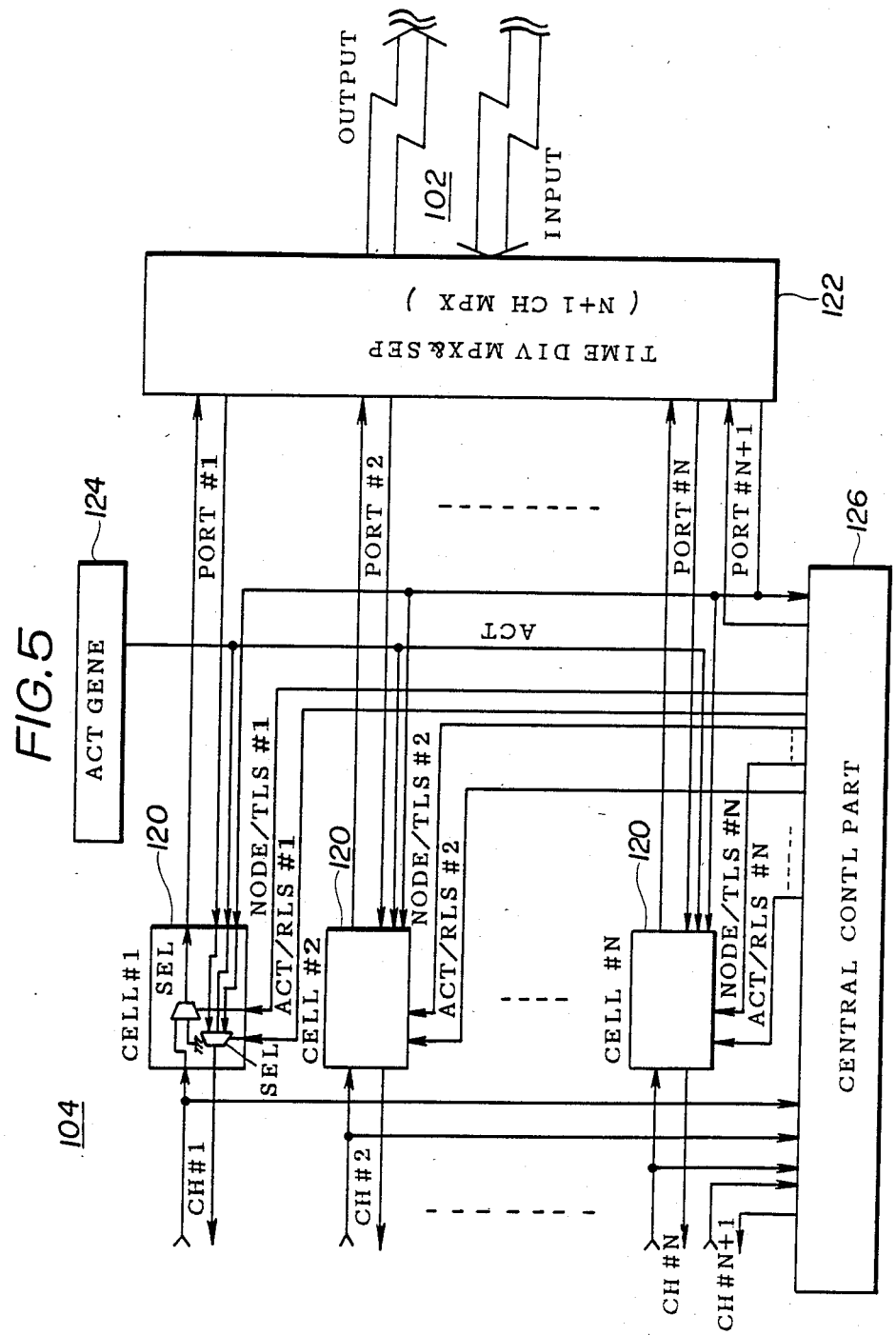
FIG. 5 is a system block diagram showing an embodiment of a router host in the communication network structure shown in FIG. 1.

Returning now to the description of the embodiment shown in FIG. 1, two communication networks 100 are coupled to each other through the long-distance line 102 through the router hosts 104. One router host 104 is provided at each boundary between the communication network 100 and the long-distance line 102. FIG. 5 shows an embodiment of the router host 104. The router host 104 is provided between the channels of the communication network 100 to which the router host 104 belongs and the long-distance line 102 which connects to a time division multiplexing and separating circuit 122 of a router host 104 which belongs to another communication network 100. As shown in FIG. 5, the router host 104 has a plurality of transmission/reception control cells 120 provided in correspondence with and connected to the channels of the communication network 100 to which the router host 104 belongs, the time division multiplexing and separating circuit 122 connected to input and output ports of the transmission/reception cells 120, an active signal generating circuit 124 for generating an active signal ACT, and a central control part 126. Each transmission/reception control cell 120 has a pair of data selectors SEL (only one pair shown).

Figure 6:
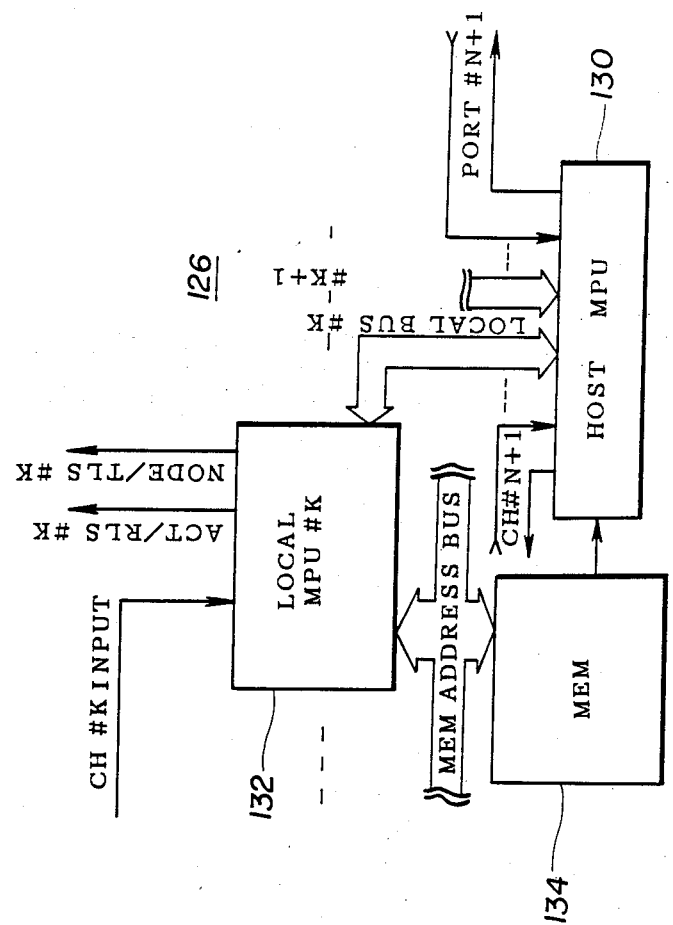
FIG. 6 is a system block diagram showing an embodiment of a central control part of the router host shown in FIG. 5.

FIG. 6 shows an embodiment of the central control part 126. The central control part 126 has a host main processor unit (MPU) 130, local MPUs 132 provided in correspondence with the channels (only the kth local MPU 132 shown), and a routing table memory 134. The routing table memory 134 is hence provided in the router host 104 and stores an identification information including host numbers of hosts which are directly connected to another communication network 100 which is coupled to the router host 104 through the long-distance line 102.

Out of the channels, a channel directly connected to the central control part 126 will be referred to as a control channel, and this control channel has the router host number. The ports couple the input and output channels to the time division multiplexing and separating circuit 122, and a port which connects the central control part 126 and the time division multiplexing and separating circuit 122 will be referred to as a control port.

Next, a description will be given of the processes carried out by a caller router host 104 which makes the connection request. The local MPUs 132 within the central control part 126 supervise a first incoming signal to the unused channels of the caller router host 104 other than the input and output control channels, that is, the receipt of a first sending signal. When the receipt of the first sending signal by a first receiving input channel is detected by one local MPU 132, the output channel having the channel number corresponding to that of the first receiving input channel and all of the unused input channels except the first receiving input channel are closed by the local MPUs 132, and a first predetermined signal (active signal) is outputted immediately to an output channel having a channel number corresponding to that of the first receiving input channel. Thereafter, the host MPU 130 collates a destination host number included in the first sending signal and all of the host numbers registered in the routing table which is stored in the routing table memory 134.

When one of the registered host numbers in the routing table coincides with the destination host number, the one local MPU 132 outputs a temporary first returning signal (ACT) to the output channel having the channel number corresponding to that of the first receiving input channel after a network time constant (third predetermined time) elapses, so as to temporarily fix a path (link) between the source host and the caller router host 104.

The receipt of the first returning signal is guaranteed within the network time constant. In the case of the full duplex communication, the network time constant starts from the detection of the first receiving input channel which receives the first sending signal, and the network time constant is a sum of a propagation delay time of two times a maximum tolerable network length (that is, a return trip) and a time it takes for a terminal host to start sending the first returning signal from a time when the first sending signal is received. In the case where both the full duplex communication and the half duplex communication are to be included, the network time constant starts from an end of the first sending signal, and the network time constant is a sum of a propagation delay time of two times a maximum tolerable network length and a time it takes for a terminal host to start sending the first returning signal after the receipt of the first sending signal ends.

After the temporary path is fixed, the host MPU 130 within the central control part 126 transmits a caller information including the port designation information and the first sending signal to a listener router host 104 which is connected to the other end of the long-distance line 102 by use of the control output port of the long-distance line 102. The caller information is transmitted by use of the control channel when the destination host number included in the first sending signal exists in the routing table stored in the routing table memory 134, that is, when the destination router host is connected to another communication network 100 which is connected to the listener router host 104 located on the other end of the long-distance line 102 from the caller router host 104 which receives the first sending signal. The port designation information designates an available unused port of the long-distance line 102 required for a new communication and is transmitted to the listener router host 104.

After the caller information is transmitted, the host MPU 130 within the central control part 126 of the caller router host 104 supervises at the control input port the receipt of a connection completion information including the port designation information and a first returning signal. The connection completion information is transmitted by use of the control channel when the listener router host 104 which received the caller information successfully catches the destination host. The port designation information is used for confirming the port used.

When the connection completion information is detected, the local MPU 132 of the caller router host 104 uses a reception line selection signal RLS to connect the designated output port on the side of the time division multiplexing and separating circuit 122 to the output channel having the channel number corresponding to that of the first receiving input channel. As a result, the first returning signal included in the connection completion information is outputted from the output channel having the channel number corresponding to that of the first receiving input channel.

Then, the local MPU 132 of the caller router host 104 uses a transmission line selection signal TLS to connect the first receiving input channel to the input port on the side of the time division multiplexing and separating circuit 122 having a channel number corresponding to that of the first receiving input channel. The closed channels other than those corresponding to the designated port are opened and unused.

The input channel which is connected to the input port on the side of the time division multiplexing and separating circuit 122 by the transmission line selection signal TLS becomes in use, and the central control part 126 supervises this connection. The central control part 126 supervises the channel with the fixed path and releases the channel as an unused channel when the input signal continues a high or low level state for the fourth predetermined time.

Next, a description will be given of the processes of the listener router host 104 which responds. The host MPU 130 within the central control part 126 of the router host 104 supervises at the control input port the receipt of the caller information. When the receipt of the caller information is detected, the port designation information is extracted from the caller information. In addition, the input and output channels other than those corresponding to the designated port are disconnected by the local MPUs 132 of the listener router host 104, and the control input port is immediately connected to the output channel corresponding to the designated port by use of the reception line selection signal RLS. The first sending signal included in the caller information is outputted from the output channel corresponding to the designated port.

After the third predetermined time elapses from the time when the first sending signal is outputted, the host MPU 130 of the listener router host 104 supervises the input channel corresponding to the designated output port. When the first returning signal is detected in this input channel which is supervised, the reception and transmission line selection signals RLS and TLS of the designated port are used to connect the designated input and output ports of the long-distance line 102 to the output and input channels corresponding to the designated input and output ports. In addition, the connection completion information is outputted from the control output port. At the same time, the channels other than the closed channel corresponding to the designated port are opened.

Next, a description will be given of the processes of the terminal host T which makes a registration or erasure. A terminal host T is registered in the following manner. The first sending signal (terminal registration information) including the destination host number as the router host number, the caller (source) host number as the terminal host number and the registration/erase information as the registration information is transmitted from the terminal output channel. The terminal registration information is transmitted from the terminal host T to the router host 104 when turning a power source ON, modifying the network structure or the like.

Then, the receipt of a terminal registration completion information is supervised at the terminal input channel. The terminal registration completion information indicates whether or not the requested registration of the terminal host T is completed, and the terminal registration completion information is transmitted from the router host 104 to the terminal host T which made the registration request. When the receipt of the terminal registration completion information is detected, a discrimination is made to determine whether or not the registration of the terminal host T is completed. If the registration of the terminal host T is not completed, the registration of the terminal host T is carried out again. But when the registration of the terminal host T is completed, it is possible to make a communication with the newly registered terminal host T.

When erasing a registered terminal host T, modifying the registered terminal host T, or turning the power source OFF, the following processes are carried out. First, the first sending signal (terminal erase information) including the destination host number as the router host number, the caller (source) host number as the terminal host number, and the registration/erase information as the erase information is outputted from the terminal output channel. The terminal erase information is transmitted from the terminal host T to the router host 104 when turning OFF the power source, for example.

Then, the receipt of a terminal erase completion information is supervised at the terminal input channel. The terminal erase completion information indicates whether or not the requested erasure of the terminal host T is completed. The terminal erase completion information is transmitted from the router host 104 to the terminal host T which made the erase request. When the receipt of the terminal erase completion information is detected, a discrimination is made to determine whether or not the terminal erasure is completed.

If the erasure of the terminal host T is not completed, the erasure of the terminal host T is carried out again.

Next, a description will be given of the processes of the router hosts 104 when registering or erasing the terminal host T. The registration of the terminal host T is carried out in the following manner. First, the receipt of the first sending signal (terminal registration information) intended for a first router host 104 is supervised at the control input channel of the first router host 104. The first router host 104 is connected to the common communication network 100 to which the terminal host T making the registration (or erase) request is connected. A second router host 104 is coupled to the first router host 104 through the long-distance line 102. When the terminal registration information is detected, the first predetermined signal (active signal) is immediately outputted to the control output channel. The terminal registration information is outputted from the control output port to the second router host 104.

The second router host 104 stores into the routing table memory 134 thereof the terminal host number included in the terminal registration information obtained from the control input port, and uses the control port to return the terminal registration completion information. The second router host 104 which receives the terminal registration completion information outputs the terminal registration completion information to the control output channel.

On the other hand, the erasure of the registered terminal host T is carried out as follows. First, the receipt of the first sending signal (terminal erase information) intended for the first router host 104 is supervised at the control input channel of the first router host 104. When the receipt of the terminal erase information is detected, the first predetermined signal (active signal) is immediately outputted to the control output channel. The terminal erase information is outputted from the control output port to the second router host 104. The second router host 104 erases from the routing table memory 134 thereof the terminal host number included in the terminal erase information obtained from the control input port, and returns the terminal erase completion information by use of the control port. The first router host 104 which receives the terminal erase completion information outputs the terminal erase completion information to the control output channel.

Next, a description will be given of the flow of the terminal registration information when starting up the communication network 100. FIGS. 7A through 7D are diagrams for explaining the flow of the terminal registration information when starting up the communication network structure shown in FIG. 1 for the case where the communication networks 100 do not form a loop by the router hosts 104, that is, the communication networks 100 form an open loop. FIGS. 8A through 8C are diagrams for explaining the flow of the terminal registration information when starting up the communication network structure shown in FIG. 1 for the case where the communication networks 100 form a loop by the router hosts 104. In FIGS. 7A through 7D and FIGS. 8A through 8C, groups of terminal hosts T shown in FIG. 1 are denoted by A, B, C, D, E, and F, and a flow of the terminal registration information is indicated by a phantom line.

First, a description will be given of the case where the communication networks 100 do not form a loop by the router hosts 104. It will be assumed that the groups A, B, . . . , and F connected to the communication networks 100 are started up simultaneously and the terminal registration information is transmitted. Each terminal host T knows the router host number of all of the router hosts 104 which are connected to the communication network 100 to which the terminal host T is connected, and the registration of the terminal host T is carried out with respect to all of these router hosts 104. The registration of the terminal host T is required when starting up the terminal host, and the registration is carried out by an input/output processor or an initial program load.

Figure 7A:
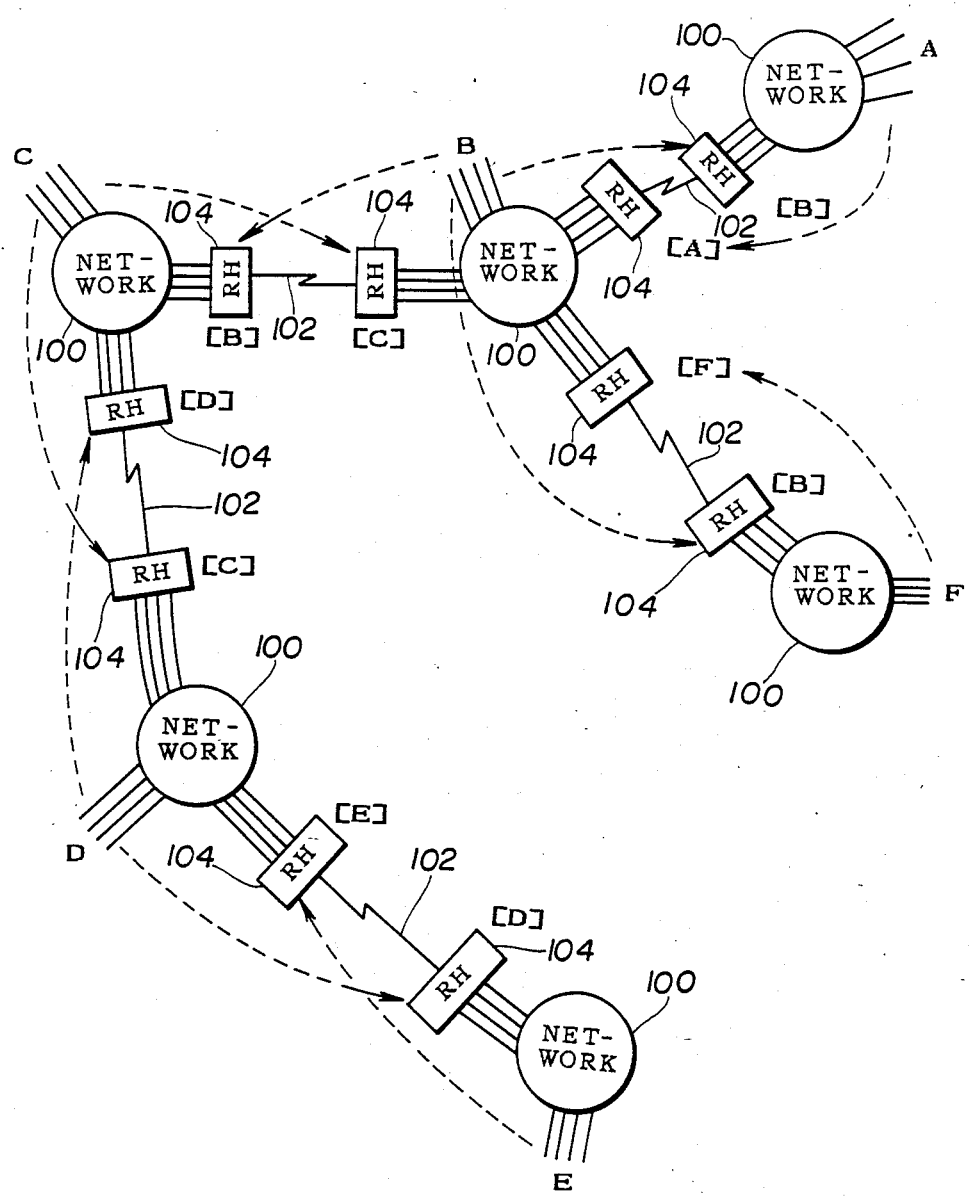
FIGS. 7A through 7D and FIGS. 8A through 8C are diagrams for explaining the flow of terminal registration information when starting up the communication network structure shown in FIG. 1 respectively for the case where no loop is formed in the communication network structure and the case where a loop is formed in the communication network structure.
Figure 7B:
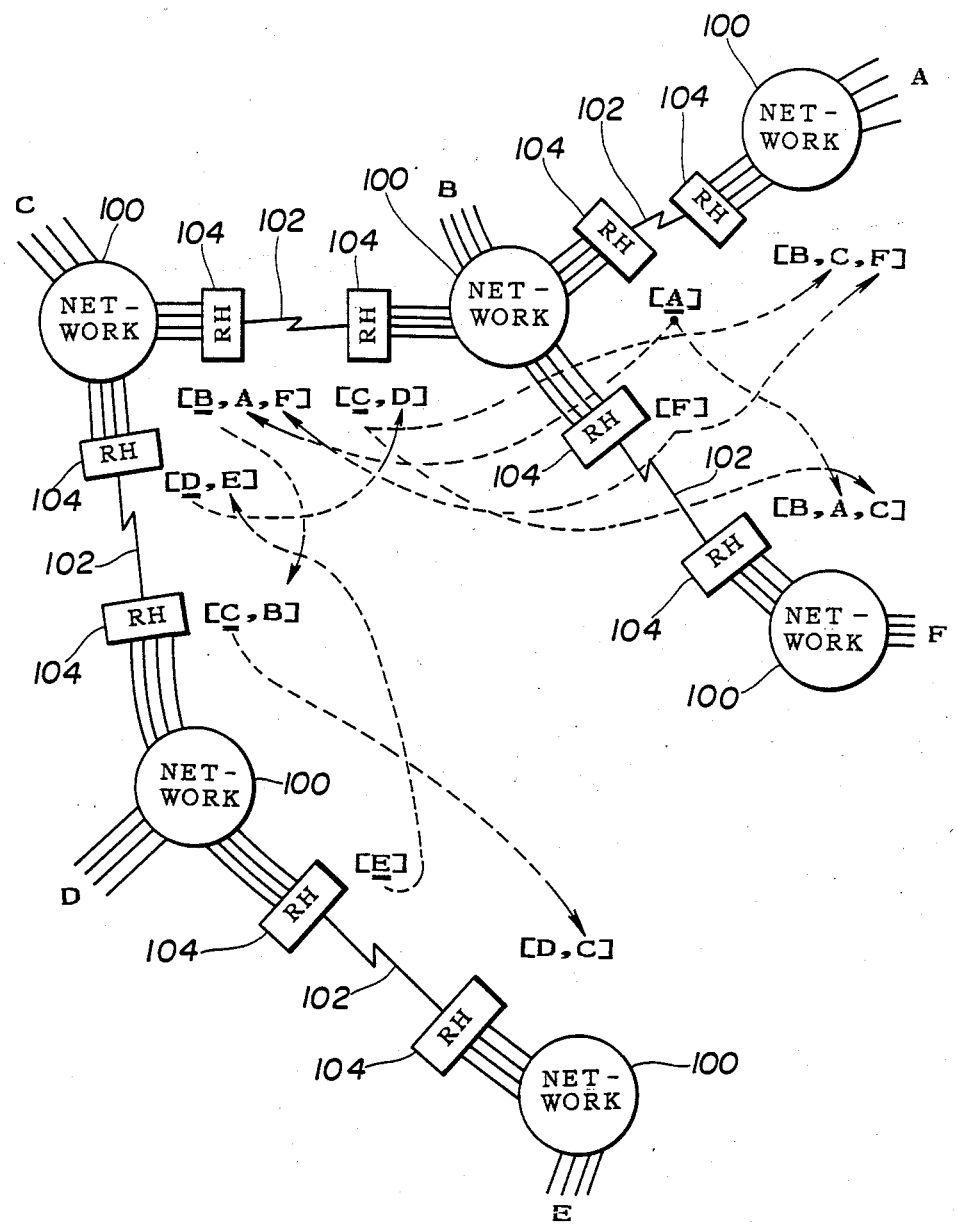
Figure 7C:
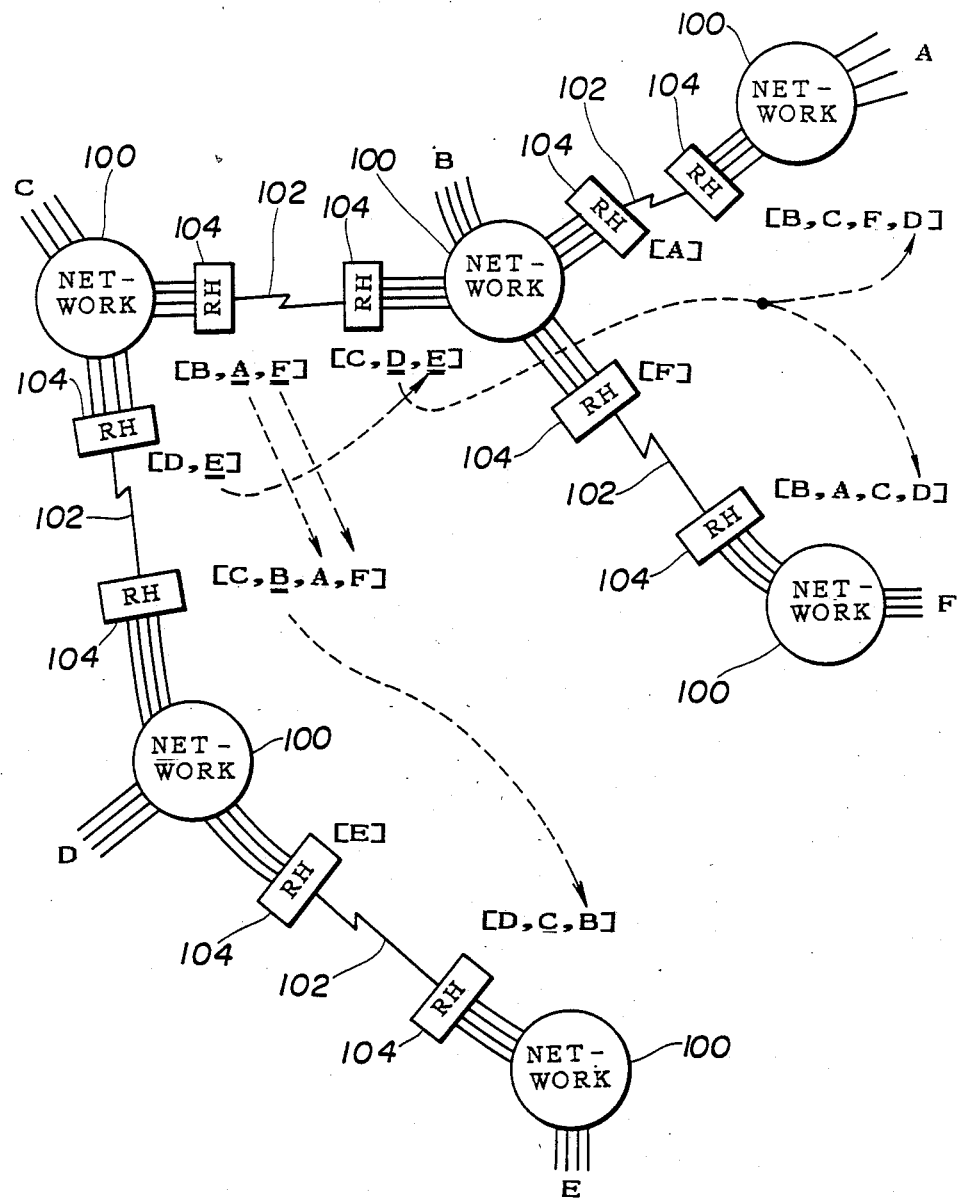
Figure 7D:
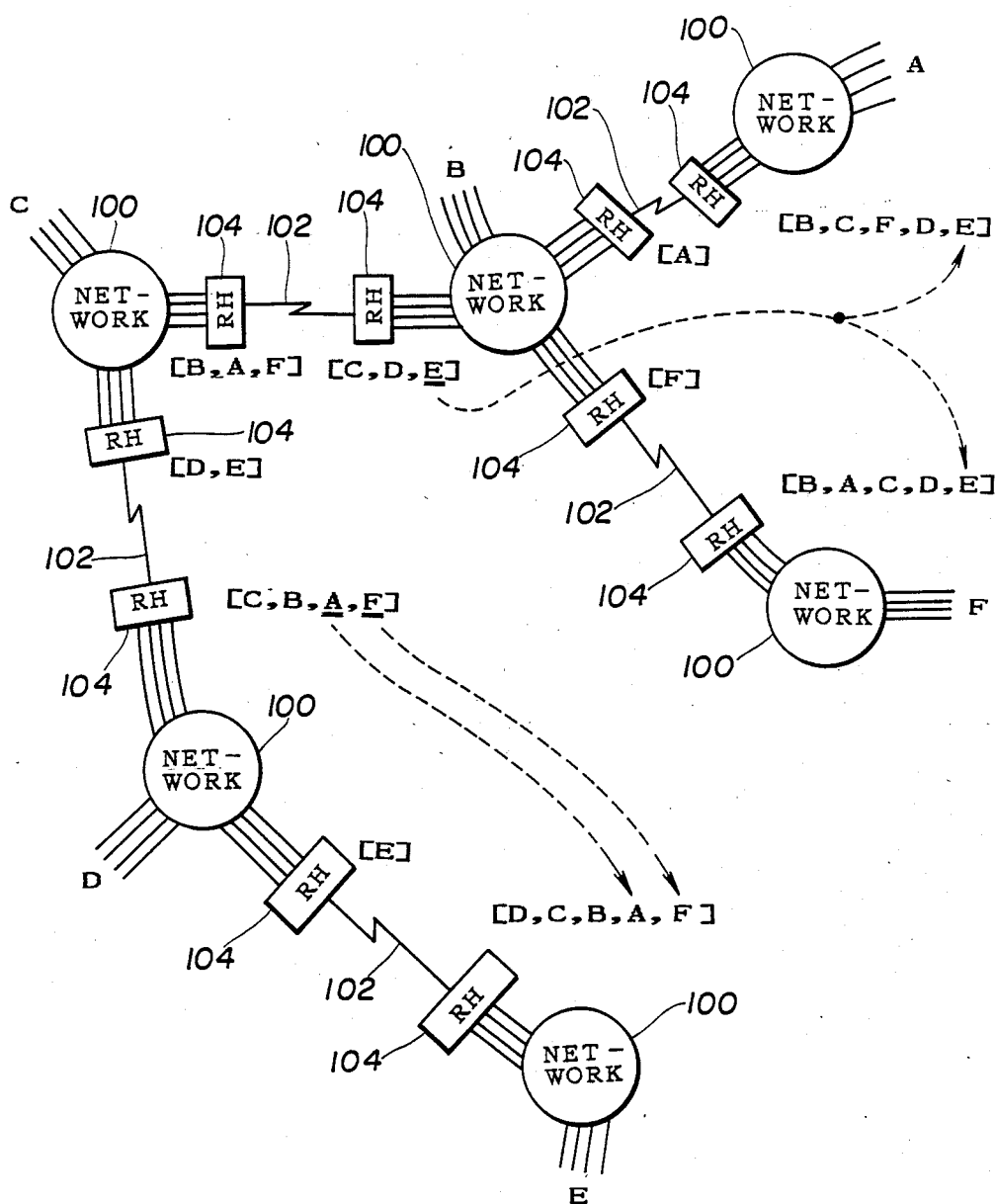
Figure 8A:
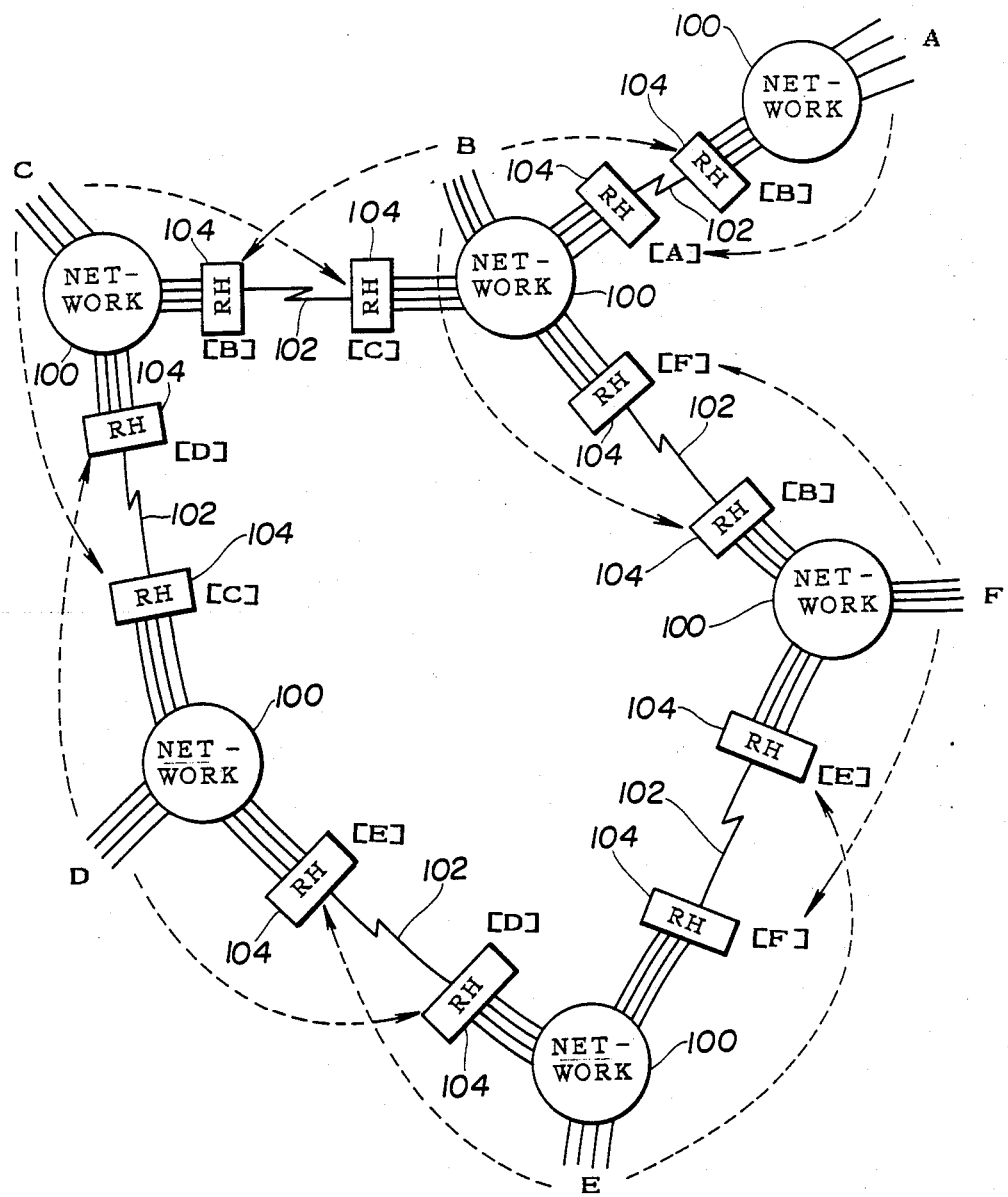
Figure 8B:
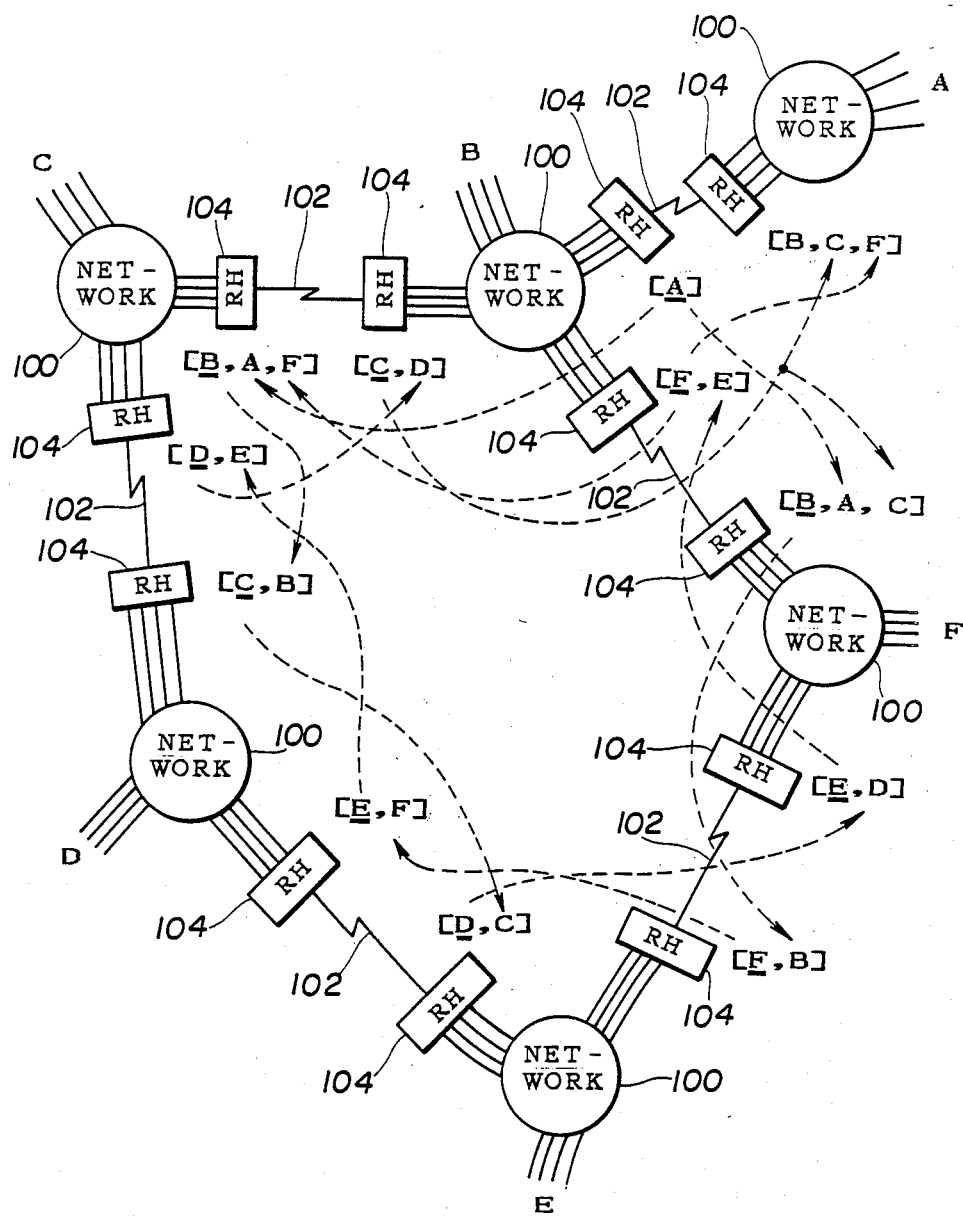
Figure 8C:
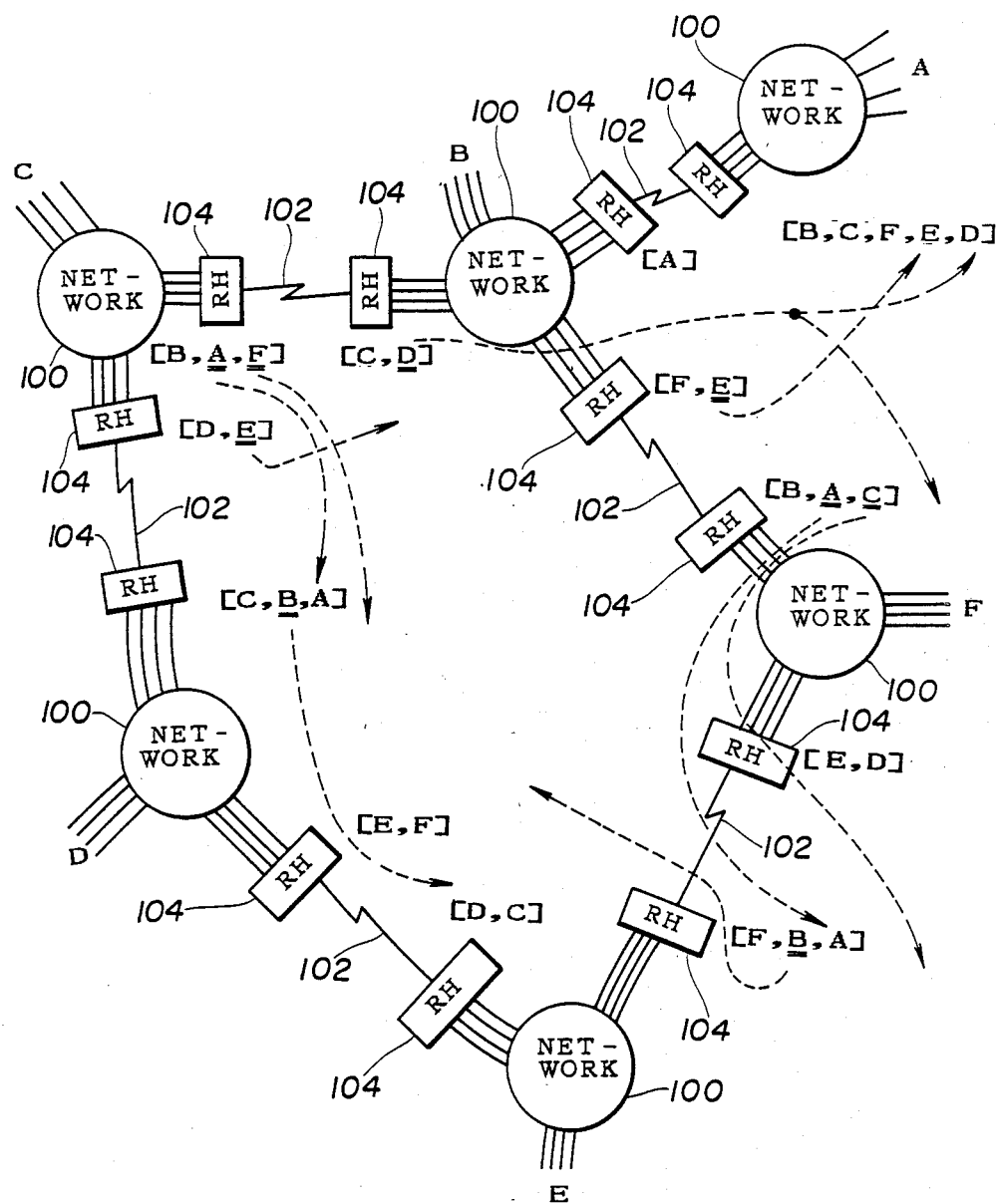

In a first phase shown in FIG. 7A, each terminal host number is registered in the routing table of the routing table memory 134 within each router host 104 which is provided in correspondence with the router hosts 104 connected to the communication network 100 to which the terminal host T is connected. In other words, when a first router host is connected to a first communication network and a second router host is connected to a second communication network and the first and second router hosts couple the first and second communication networks through a long-distance line, the terminal host number of the terminal host connected to the first communication network is registered in the routing table of the second router host. Hence, the terminal registration information on the terminal hosts T are registered in the router hosts 104 as indicated in brackets in FIG. 7A, where A, B, ..., and F denote the terminal registration information on the terminal hosts T included in the respective groups A, B, ..., and F.

When another router host is connected to the second communication network and a third router host is connected to a third communication network and the second and third router hosts couple the second and third communication networks through a long-distance line, the terminal registration information registered in the second router host is registered in the routing table of the third router host. Thus, in a second phase, the terminal registration information on the terminal hosts T are registered in the router hosts 104 as indicated in brackets in FIG. 7B.

When the router host 104 receives the terminal registration information to be registered in the routing table thereof, this terminal registration information is transmitted to another router host 104 which is coupled to the router host 104 through the long-distance line. Hence, the above described operation is repeated in a third phase shown in FIG. 7C and a fourth phase shown in FIG. 7D. As a result, the routing table in each of the router hosts 104 finally become as indicated in the brackets in FIG. 7D.

Next, a description will be given of the case where the communication networks 100 forms a loop by the router hosts 104. The registration of the terminal host T can be carried out similarly as described in conjunction with FIGS. 7A through 7D even when a loop is formed in a portion of the communication network structure. When the first sending signal detected from the control channel of the first router host 104 is the terminal registration information intended for the first router host 104, the first predetermined signal is immediately outputted to the control channel and the terminal registration information is outputted to the control output channel. Hence, the terminal registration information from the terminal host T is transmitted to the second router host 104. The first router host 104 is connected to the common communication network 100 to which the terminal host T making the registration (or erase) request is connected. The second router host 104 is coupled to the first router host 104 through the long-distance line 102. In the second router host 104 in which the terminal registration information is to be registered, when the receipt of the first sending signal (terminal registration information) from the terminal host T is detected, the terminal host number included in the first sending signal is stored in the routing table and the terminal registration completion information is outputted to the control output port. The second router host 104 makes an inquiry to all of the router hosts 104 which are connected to the common communication network 100 to find out whether or not the terminal host number to be registered in the second router host 104 is already registered in one of the router hosts 104 connected to the common communication network 100. The second router host 104 registers the terminal host number in the routing table thereof when none of the router hosts 104 connected to the common communication network 100 has the terminal host number registered therein. The renewal of the content of the routing table is not performed when the terminal host number is already registered in one of the router hosts 104 connected to the common communication network 100.

FIG. 8A shows a first phase in which the groups A, B, ..., and F of the terminal hosts T transmit the terminal registration information to all of the router hosts 104 connected to the respective communication networks 100 which are directly coupled to the groups A, B, ..., and F, similarly as in the first phase shown in FIG. 7A described before. In a third phase shown in FIG. 8C, out of the router hosts 104 which are connected to the communication network 100 to which the group B is connected, for example, an attempt is made to register the terminal registration information on the group E with respect to the router host 104 which is already registered with the terminal registration information [C, D] in a second phase shown in FIG. 8B. However, in this case, another router host 104 connected to the same communication network 100 is already registered with the terminal registration information E (that is [F, E]), and the registration of the terminal host T in the group E does not take place with respect to the router host 104 which is already registered with the terminal registration information [C, D] in the second phase.

Therefore, the terminal registration information is transmitted repeatedly in this manner, and the registration of the terminal registration information is made in the routing tables of the router hosts 104 so that an average routing time essentially becomes a minimum in the communication network structure as a whole.

In FIG. 6 described before, the central control part 126 uses the host MPU 130 and the local MPUs 132, but it is possible to use a single MPU to carry out the functions of the host MPU 130 and the local MPUs 132.

According to the present invention, there is no need to modify the various time constants such as the first and third predetermined times (link time constant and network time constant) determined by the communication network, even when the scale of the communication network structure is enlarged. The through-put is high compared to the conventional communication network including a long-distance line, and it is possible to use a high-speed line. Moreover, there is virtually no load on the terminal hosts. Furthermore, there is no need to know the communication network to which the destination terminal is connected, that is, there is no need to know the number (address) of the communication network. In the case where a portion of the communication network structure forms a loop, it is possible to register the terminal registration information in the routing tables of the router hosts so that an average routing time essentially becomes a minimum in the communication network structure as a whole. There is also an advantage in that a router host can be newly connected to the communication network structure even when the communication network structure is in use.

Further, the present invention is not limited to these embodiments, but various variations and modifications may be made without departing from the scope of the present invention.

What is claimed is:

1. A communication network structure comprising:
  a plurality of communication networks, each of said communication networks having a multi-conjunction architecture and including a plurality of node apparatuses, a plurality of first transmission paths for coupling the node apparatuses, and a plurality of terminal hosts connected to at least an arbitrary one of the node apparatuses, a maximum propagation delay time of the first transmission path being less than a predetermined value;
  one or a plurality of router hosts connected to each of said communication networks; and
  a second transmission path for coupling two said communication networks through a pair of said router hosts respectively located on ends of said second transmission path, a maximum propagation delay time of said second transmission path being greater than or equal to said predetermined value,
  said router host having first means for multiplexing signals to and separating signals from said second transmission path, second means coupled to said first means for storing identification information including host numbers of at least the terminal hosts which are directly connected to a said communication network which is coupled to said router host through a said second transmission path, third means coupled to said first and second means for controlling operations of said router host, input and output channels connected to one of the node apparatuses of a said communication network and to said third means, and input and output ports connected to said third means and said second transmission path,
  said third means detecting a first receiving input channel which receives a first sending signal first out of unused light channels connected to said one of the node apparatuses of a said communication network and closing an output channel having a channel number corresponding to that of the first receiving input channel and all of the unused input channels except the first receiving input channel when the first receiving input channel is detected to immediately output an active signal to the output channel having the channel number corresponding to that of the first receiving input channel,
  said third means collating a destination host number included in the first sending signal and the host numbers stored in said second means and outputting a temporary first returning signal to the output channel having the channel number corresponding to that of the first receiving input channel when the destination host number exists in the host numbers stored in said second means, so as to fix a temporary path between a source host which originates the first sending signal and said router host;
  said third means outputting to a control output port of the output ports a caller information including a port designation information and the first sending signal when the destination host number exists in the host numbers stored in said second means, said port designation information being an identification information of a port of said first means corresponding to the first receiving input channel,
  said third means detecting a receipt of a connection completion information including the port designation information and a first returning signal at a control input port of the input ports and connecting the designated output port to the output channel having the channel number corresponding to that of the first receiving input channel so as to output the first returning signal from the output channel having the channel number corresponding to that of the first receiving input channel and connecting the first receiving input channel to one of the output ports corresponding to the first receiving input channel when the destination host number exists in the host numbers stored in said second means,
  said third means opening the closed channel other than the designated channels after the first receiving input channel and the output channel having the channel number corresponding to that of the first receiving input channel are connected to the corresponding input and output ports,
  said third means supervising a channel with a fixed path and releasing the channel as an unused channel when a signal received at the channel continues a predetermined state for a communication end detection time constant.

2. A communication network structure as claimed in claim 1 in which said third means supervises a receipt of the caller information at the control input port and when the receipt of the caller information is detected said third means extracting the port designation information from the caller information, disconnecting the input and output channels other than those corresponding to the designated port, and connecting the control input port to the output channel corresponding to the designated port, said third means connecting the designated input and output ports of said second transmission path to the output and input channels corresponding to the designated input and output ports, outputting the connection completion information from the control output port, and opening the channels other than the closed channels corresponding to the designated port when the first returning signal is detected at the input channel corresponding to the designated output channel after a network time constant elapses from a time when the first sending signal is outputted.

3. A communication network structure as claimed in claim 1 in which a said terminal host which is connected to a said communication network to which an arbitrary one of said router hosts is directly connected requests registration of a terminal registration information with respect to a predetermined one of said router host which is coupled to said arbitrary router host through a said second transmission path, said third means of said arbitrary router host outputting the active signal to the control port and transmitting the terminal registration information from the control port to said predetermined router host when the first sending signal includes the terminal registration information intended for said arbitrary router host and outputting a terminal registration completion information to a control output channel of the output channels when the terminal registration completion information is received from said predetermined router host to thereby register the terminal registration information in said predetermined router host, said terminal registration information including a host number of said terminal host making the request.

4. A communication network structure as claimed in claim 3 in which said third means of said predetermined router host stores the host number included in said terminal registration information in said second means thereof when a receipt of the first sending signal including said terminal registration information is detected and transmitting the terminal registration completion information to the control output port thereof.

5. A communication network structure as claimed in claim 3 in which said third means of said predetermined router host makes an inquiry to all of said router hosts directly connected to a said communication network to which said predetermined router host is directly connected on whether or not the host number of said terminal host making the request is already registered in one of said router hosts when a receipt of the first sending signal including said terminal registration information is detected, and if the host number included in said terminal registration information is already registered in one of said router hosts said predetermined router host storing the host number in said second means of said predetermined router host and transmitting the terminal registration completion information to the control output port thereof.

6. A communication network structure as claimed in claim 1 in which a said terminal host which is connected to a said communication network to which an arbitrary one of said router hosts is directly connected requests erasure of a terminal registration information with respect to a predetermined one of said router host which is coupled to said arbitrary router host through a said second transmission path, said third means of said arbitrary router host outputting the active signal to the control port and transmitting a terminal erase information from the control port to said predetermined router host when the first sending signal includes the terminal erase information intended for said arbitrary router host and outputting a terminal erase completion information to a control output of the output channels when the terminal erase completion information is received from said predetermined router host to thereby erase the terminal registration information in said predetermined router host, said terminal erase information including a host number of said terminal host making the request.

7. A communication network structure as claimed in claim 6 in which said third means of said predetermined router host erases the host number included in said terminal erase information from the host numbers stored in said second means thereof when a receipt of the first sending signal including said terminal erase information is detected and transmitting the terminal erase completion information to the control output port thereof.

8. A communication network structure as claimed in claim 6 in which said third means of said predetermined router host makes an inquiry to all of said router hosts directly connected to a said communication network to which said predetermined router host is directly connected on whether or not the host number of said terminal host making the request is registered in one of said router hosts when a receipt of the first sending signal including said terminal erase information is detected, and if the host number included in said terminal erase information is registered in one of said router hosts said predetermined router host erasing the host number from the host numbers stored in said second means of said predetermined router host and transmitting the terminal erase information to all of said router hosts directly connected to said communication network to which said predetermined router host is directly connected.

9. A communication network structure as claimed in claim 1 in which said communication networks are coupled in a form of an open loop, and said second means of said router host stores the host numbers of all of the terminal hosts which are indirectly coupled to said router host through the second transmission path and another router host excluding the host number of the terminal host which is directly connected to the communication network to which said router host is directly connected.

10. A communication network structure as claimed in claim 1 in which said communication networks are coupled in a form of an open loop, and the host numbers of all of the terminal hosts which are indirectly coupled to the communication network are stored without overlap by said second means of all of the router hosts directly connected to said communication network.

11. A communication network structure as claimed in claim 1 in which said communication networks are coupled in a form of a closed loop, and the host numbers of all of the terminal hosts which are indirectly coupled to the communication network are stored without overlap by said second means of all of the router hosts directly connected to said communication network.

12. A communication network structure as claimed in claim 2 in which said network time constant is a time in which a receipt of a first returning signal from a destination terminal host is guaranteed and is set to a sum of two times a propagation delay time of a maximum tolerable network length and a time it takes for the destination terminal host to start sending the first returning signal.

13. A communication network architecture comprising:
  a plurality of communication networks, each of said communication networks having a multi-conjunction architecture and including a plurality of node apparatuses, a plurality of first transmission paths for coupling the node apparatuses, and a plurality of terminal hosts connected to at least an arbitrary one of the node apparatuses, a maximum propagation delay time of the first transmission path being less than a predetermined value;
  one or a plurality of router hosts connected to each of said communication networks; and
  a second transmission path for coupling two said communication networks through a pair of said router hosts respectively located on ends of said second transmission path, a maximum propagation delay time of said second transmission path being greater than or equal to said predetermined value, said router host having first means for multiplexing signals to and separating signals from said second transmission path, second means coupled to said first means for storing identification information including host numbers of at least the terminal hosts which are directly connected to a said communication network which is coupled to said router host through a said second transmission path, third means coupled to said first and second means for controlling operations of said router host, input and output channels connected to one of the node apparatuses of a said communication network and to said third means, and input and output ports connected to said third means and said second transmission path, a said router host forming a temporary link between a source terminal host which originates a first sending signal including a destination host number as the identification information when the destination host number is included in the host numbers stored in said second means, the formation of the temporary link being repeated until the first sending signal reaches the destination host.

14. A communication network architecture as claimed in claim 13 in which said second means of said router host stores the host numbers of all of the terminal hosts which are indirectly coupled to said router host through the second transmission path and another router host excluding the host number of the terminal host which is directly connected to the communication network to which said router host is directly connected.

15. A communication network architecture as claimed in claim 13 in which the host numbers of all of the terminal hosts which are indirectly coupled to a said communication network are stored without overlap by said second means of all of the router hosts directly connected to said communication network.

16. A router host for coupling first and second communication networks through a first transmission path and another router host having an identical construction, each of said first and second communication networks having a multi-conjunction architecture and including a plurality of node apparatuses, a plurality of second transmission paths for coupling the node apparatuses, and a plurality of terminal hosts connected to at least an arbitrary one of the node apparatuses, a maximum propagation delay time of the second transmission path being less than a predetermined value, a maximum propagation delay time of said first transmission path being greater than or equal to said predetermined value, said router host comprising:

first means for multiplexing signals to and separating signals from said first transmission path;

second means coupled to said first means for storing identification information including host numbers of at least the terminal hosts which are directly connected to said first communication network which is coupled to said router host through said first transmission path and said other router host;

third means coupled to said first and second means for controlling operations of said router host;

input and output channels connected to one of the node apparatuses of said second communication network and to said third means; and input and output ports connected to said third means and said first transmission path, said router host forming a temporary link between a source terminal host which is directly connected to said second communication network and originates a first sending signal including a destination host number as the identification information when the destination host number is included in the host numbers stored in said second means.

* * * * *